(12) United States Patent
Bronstein et al.

(10) Patent No.: US 10,210,430 B2
(45) Date of Patent: Feb. 19, 2019

(54) SYSTEM AND A METHOD FOR LEARNING FEATURES ON GEOMETRIC DOMAINS

(71) Applicant: Fabula AI Limited, London (GB)

(72) Inventors: Michael Bronstein, Lugano (CH);
Davide Boscaini, Lugano (CH);
Federico Monti, Cassina Rizzardi (IT)

(73) Assignee: Fabula AI Limited, London (GB)

( * ) Notice: Subject to any disclaimer, the term of this patent is extended or adjusted under 35 U.S.C. 154(b) by 0 days.

(21) Appl. No.: 15/820,909

(22) Filed: Nov. 22, 2017

(65) Prior Publication Data

US 2018/0096229 A1    Apr. 5, 2018

Related U.S. Application Data

(63) Continuation-in-part of application No. 15/006,694, filed on Jan. 26, 2016, now Pat. No. 10,013,653.

(51) Int. Cl.
| | |
|---|---|
| *G06K 9/62* | (2006.01) |
| *G06K 9/48* | (2006.01) |
| *G06K 9/52* | (2006.01) |
| *G06F 17/14* | (2006.01) |
| *G06K 9/00* | (2006.01) |
| *G06N 3/04* | (2006.01) |
| *G06T 19/00* | (2011.01) |

(52) U.S. Cl.
CPC ........... *G06K 9/6256* (2013.01); *G06F 17/14* (2013.01); *G06K 9/00201* (2013.01); *G06K 9/481* (2013.01); *G06K 9/52* (2013.01); *G06K 9/6215* (2013.01); *G06K 9/6244* (2013.01); *G06K 9/6248* (2013.01); *G06N 3/04* (2013.01); *G06T 19/00* (2013.01); *G06N 3/0454* (2013.01)

(58) Field of Classification Search
None
See application file for complete search history.

(56) References Cited

U.S. PATENT DOCUMENTS

| | | |
|---|---|---|
| 6,081,605 A | 6/2000 | Roth |
| 6,476,803 B1 | 11/2002 | Zhang |
| 8,918,352 B2 | 12/2014 | Deng |
| 9,600,892 B2 | 3/2017 | Patel |
| 2003/0061200 A1 | 3/2003 | Hubert |
| 2007/0047802 A1* | 3/2007 | Puri ..................... G06K 9/4628 382/157 |
| 2007/0189627 A1 | 8/2007 | Cohen |

(Continued)

OTHER PUBLICATIONS

Bruna, Joan et al. "Spectral Networks and Deep Locally Connected Networks on Graphs," Proceedings of the 2nd International Conference on Learning Representations, pp. 1-14, 2013.

(Continued)

*Primary Examiner* — Martin Mushambo
(74) *Attorney, Agent, or Firm* — Saliwanchik, Lloyd & Eisenschenk

(57) ABSTRACT

A method for extracting hierarchical features from data defined on a geometric domain is provided. The method includes applying on said data at least an intrinsic convolution layer, including the steps of applying a patch operator to extract a local representation of the input data around a point on the geometric domain and outputting the correlation of a patch resulting from the extraction with a plurality of templates. A system to implement the method is also described.

81 Claims, 20 Drawing Sheets

(56) References Cited

U.S. PATENT DOCUMENTS

| | | |
|---|---|---|
| 2007/0237141 A1 | 10/2007 | Shechtman |
| 2008/0238919 A1 | 10/2008 | Pack |
| 2009/0204558 A1 | 8/2009 | Weston |
| 2011/0170781 A1 | 7/2011 | Bronstein |
| 2011/0182469 A1 | 7/2011 | Ji et al. |
| 2011/0222724 A1 | 9/2011 | Yang |
| 2011/0276314 A1 | 11/2011 | Orderud |
| 2012/0075302 A1 | 3/2012 | Cai |
| 2013/0093768 A1* | 4/2013 | Lockerman ........... G06T 11/001 345/428 |
| 2013/0223694 A1 | 8/2013 | Ricanek |
| 2014/0193076 A1 | 7/2014 | Gardiner |
| 2015/0100530 A1* | 4/2015 | Mnih .................... G06N 3/0454 706/25 |
| 2015/0112182 A1 | 4/2015 | Sharma |
| 2015/0139485 A1* | 5/2015 | Bourdev ............ G06K 9/00362 382/103 |
| 2015/0221131 A1 | 8/2015 | Luo |
| 2015/0248608 A1 | 9/2015 | Higgins |
| 2015/0278634 A1 | 10/2015 | Kato |
| 2015/0324655 A1 | 11/2015 | Chalasani |
| 2015/0347819 A1 | 12/2015 | Yin |
| 2015/0347820 A1 | 12/2015 | Yin |
| 2016/0027208 A1 | 1/2016 | Pham |
| 2016/0202844 A1 | 7/2016 | He et al. |
| 2016/0232715 A1 | 8/2016 | Lee |

OTHER PUBLICATIONS

Litman, Roee et al. "Learning Spectral Descriptors for Deformable Shape Correspondence," IEEE Transactions on Pattern Analysis and Machine Intelligence, 36(1), pp. 171-180, 2014.

Rodolà, Emanuele et al. "Dense Non-Rigid Shape Correspondence using Random Forests," Proc. of the IEEE Conference on Computer Vision and Pattern Recognition (CVPR), pp. 1-8, 2014.

Su, Hang et al. "Multi-view Convolutional Neural Networks for 3D Shape Recognition," Proc. of the IEEE International Conference on Computer Vision (ICCV), pp. 1-9, 2015.

Wei, Lingyu et al. "Dense Human Body Correspondences Using Convolutional Networks," Published in: arXiv:1511.05904, pp. 1-11, 2015.

Wu, Zhirong et al. "3D ShapeNets: A Deep Representation for Volumetric Shapes," The IEEE Conference on Computer Vision and Pattern Recognition (CVPR), pp. 1912-1920, 2015.

* cited by examiner

SYSTEM AND A METHOD FOR LEARNING FEATURES ON GEOMETRIC DOMAINS

CROSS-REFERENCE TO RELATED APPLICATION

This application is a continuation-in-part (CIP) application of U.S. Ser. No. 15/006,694, filed Jan. 26, 2016, which is incorporated herein by reference in its entirety including any figures, table, and drawings.

BACKGROUND

As known, method and system implemented in computer vision to process images, extracting hierarchical features from data, are not currently applicable with same results in domains such as computer graphics, where 3D shapes (manifolds) need to be processed, or computational sociology, dealing with networks (graphs).

Deep learning methods have recently significantly impacted many domains. Nowadays, deep learning methods are already widely used in commercial applications, including Siri speech recognition in Apple iPhone, Google text translation, and Mobileye vision-based technology for autonomously driving cars.

Deep learning refers to learning complicated concepts by a machine, by means of building them out of simpler ones in a hierarchical or "multi-layer" manner. Artificial neural networks are a popular realization of such deep multi-layer hierarchies inspired by the signal processing done in the human brain. Though these methods have been known from the late 1960s, the computational power of modern computers, availability of large datasets, and efficient stochastic optimization methods allowed creating and effectively training complex network models that made a qualitative breakthrough in performance.

Computer vision perhaps has been affected most dramatically by deep learning. Traditional approaches in this domain relied on "hand-crafted" axiomatic or empirical models. It appeared that constructing axiomatic models for increasingly complex concepts is nearly impossible, while at the same time, the growth of publicly available image data allowed "modelling by example". Simply put, while it is hard what makes a dog look like a dog, one can get millions examples of dog images and use a sufficiently complex generic model to learn the "dog model" from the data. The work of Krizhevsky et al. achieving unprecedented performance ImageNet benchmark in 2012, has provoked a sharp resurgence of interest in deep learning methods. Deep learning methods have been since applied to practically any problem in computer vision, almost invariably outperforming the previous approaches. Overall, this sequence of successes has brought to an overwhelming trend in the community to abandon "hand-crafted" models in favor of deep learning methods.

Among the key reasons for the success of deep neural networks are important assumptions on the statistical properties of the data, namely stationarity and compositionality through local statistics, which are present in natural images, video, and speech. From the geometric perspective, one can think of such signals as functions on the Euclidean space (plane), sampled on a grid. In this case, stationarity is owed to shift-invariance, locality is due to the local connectivity, and compositionality stems from the multi-resolution structure of the grid. These properties are exploited by convolutional neural networks (CNNs), which are built of alternating convolutional and downsampling (pooling) layers. The use of convolutions allows extracting local features that are shared across the image domain and greatly reduces the number of parameters in the network with respect to generic deep architectures, without sacrificing the expressive capacity of the network. The parameters of different layers are learned by minimizing some task-specific cost function.

Dealing with signals such as speech, images, or video on 1D-, 2D- and 3D Euclidean domains, respectively, has been the main focus of research in deep learning for the past decades. However, in the recent years, more and more fields have to deal with data residing on non-Euclidean geometric domains (referred here as geometric data for brevity).

For instance, in social networks, the characteristics of users can be modelled as signals on the vertices of the social graph. In genetics, gene expression data are modelled as signals defined on the regulatory network. In computer graphics and vision, 3D shapes are modelled as Riemannian manifolds (surfaces) endowed with properties such as colour texture or motion field (e.g. dynamic meshes). Even more complex examples include networks of operators, such as functional correspondences or difference operators in a collection of 3D shapes, or orientations of overlapping cameras in multi-view vision ("structure from motion") problems. Furthermore, modelling high-dimensional data with graphs is an increasingly popular trend in general data science, where graphs are used to describe the low-dimensional intrinsic structure of the data.

On the one hand, the complexity of geometric data and availability of large datasets (in the case of social networks, of the order of billions of examples) make it tempting and very desirable to resort to machine learning techniques. On the other hand, the non-Euclidean nature of such data implies that there are no such familiar properties as global parameterization, common system of coordinates, vector space structure, or shift-invariance. Consequently, basic operations such as linear combination or convolution that are taken for granted in the Euclidean case, are even not well defined on non-Euclidean domains.

This happens to be a major obstacle that so far has precluded the use of successful deep learning methods such as convolutional or recurrent neural networks on non-Euclidean geometric data. As a result, the quantitative and qualitative breakthrough that deep learning methods have brought into speech recognition, natural language processing, and computer vision has not yet come to fields such as computer graphics or computational sociology. Given the great success of CNNs in computer vision, devising a non-Euclidean formulation of CNNs could lead to a breakthrough in many fields wherein data reside on non-Euclidean domains.

Many machine learning techniques successfully working on images were tried "as is" on 3D geometric data, represented for this purpose in some way "digestible" by standard frameworks. In particular, several prior art methods applied traditional Euclidean CNNs for shape classification, where the 3D geometric structure of the shapes was represented as a set of range images or a rasterized volume. The main drawback of such approaches is their treatment of geometric data as Euclidean structures. First, for complex 3D objects, Euclidean representations such as depth images or voxels may lose significant parts of the object or its fine details, or even break its topological structure. Second, Euclidean representations are not intrinsic, and vary due to pose or deformation of the object. Achieving invariance to shape deformations, a common requirement in many vision applications, is extremely hard with the aforementioned methods and requires huge training sets due to the large number of degrees of freedom involved in describing non-rigid deformations.

Referring to FIG. 1, an application of volumetric CNN to a deformable shape is illustrated. A cylinder shape 1 to which a non-rigid deformation is applied. A 4×4×4 3D filter 3a (represented with cubes) constituting part of the volumetric CNN is applied at point 2 on the cylinder 1 before the deformation, and the 3D filter 3b is applied at the same point 2 after the deformation are different. Darkened cubes represent the elements of the filter that correlate with the shape 1. It is evident from FIG. 1 that different filters have to be applied to the cylinder 1 and its deformed version.

For more abstract geometric data, such as graphs or networks, a Euclidean representation may not exist at all. One therefore has to generalize signal processing and learning methods to graphs, a research field generally referred to as signal processing on graphs.

Traditional signal processing has been developed primarily for linear shift-invariant (LSI) systems, which naturally arise when dealing with signals on Euclidean spaces. In this framework, which dates back to first computers and is based on mathematics that is several centuries old, basic filtering operations can be represented as convolutions, linear shift-invariant operators. The fundamental property that convolution operators are diagonalised in the Fourier basis on Euclidean domains (colloquially known as the "Convolution Theorem"), together with fast numerical algorithms for Fourier transform computation (FFT), have been the main pillar of signal and image processing in the late part of the 20th century.

Spectral analysis techniques were extended to graphs considering the orthogonal eigenfunctions of the Laplacian operator as a generalization of the Fourier basis. Constructions such as wavelets, short-time Fourier transforms, or algorithms such as dictionary learning originally developed for the Euclidean domain, were also generalized to graphs.

Bruna et al. employed a spectral definition of "convolution", where filters are defined by their Fourier coefficients in the graph Laplacian eigenbasis. In classical signal processing in Euclidean spaces, by virtue of the Convolution Theorem, the convolution of two functions can be computed in the frequency domain as a product of their respective Fourier transforms:

$$f*g = \mathcal{F}^{-1}(\mathcal{F}f \cdot \mathcal{F}g),$$

where $\mathcal{F}, \mathcal{F}^{-1}$ denote the forward and inverse Fourier transforms, respectively, $f$, $g$ are some functions, and * denotes the convolution operation. On a graph, the convolution may be defined by the above formula, where the Fourier transform is understood as projection on the graph Laplacian eigenbasis. This method is designed to work on a single graph; a spectral model learned on one graph is in general not transferable to another one, since the filters are expressed w.r.t. a basis that is graph-specific (even for isometric graphs, the Laplacian eigenbases are defined up to sign).

Referring to FIG. 2, an example illustrating the difficulty of generalization across non-Euclidean domains is shown. A function defined on a human shape 4 (function values are represented by color shades) undergoes edge-detection filtering in the frequency domain resulting in function 5. The same filter applied on the same function but on a different (nearly-isometric) shape 6 produces a completely different result.

Generally speaking, this seems to be a common plight of most existing methods for signal processing and learning on graphs, which should be more appropriately referred to as "signal processing and learning on a graph". While at a first glance this seems to be a subtle difference, for machine learning algorithms, the generalization ability is a key requirement.

The problem at the base of the present invention is how to improve and successful use deep learning methods, such as convolutional neural networks, on non-Euclidean geometric data, including coping with shape non-rigid and elastic deformations or transferring the CNN model learned on one graph to another graph, thus overcoming all the limitations currently affecting the prior art methods.

BRIEF SUMMARY

The idea of solution at the base of the present invention is to adapt convolutional neural networks to general geometric domains, more particularly to non Euclidean domains, by using the intuition of convolution as "correlation with template". According to this idea, the notion of a "patch" is applied to non-Euclidean geometric domains, i.e. to a continuous (topological) space that has a local (non-Euclidean) metric structure, for instance Riemannian manifolds and graphs.

In the light of this idea, the applicant has identified a specific method for extracting "patches" in the non-Euclidean geometric domains which is described below. The method may be applied also to Euclidean domains, which constitute a particular case of non-Euclidean domains.

On the base of this idea of solution, the technical problem is solved by a method for extracting hierarchical features from data defined on a geometric domain, comprising applying on the data at least an intrinsic convolution layer, including the steps of applying a patch operator to extract a local representation of the input data around a point on the geometric domain and outputting the correlation of a patch resulting from the extraction with a plurality of templates.

The correlation of the patch resulting from the extraction with the templates provides the hierarchical features extracted from the data defined on the geometric domain.

The method according to the present invention is implemented in a computer system, i.e. the invention relates to a computer implemented method. The computer system may include a network. More particularly, any processing step is executed in means of said computer system, and any data in input to the method or provided as output thereof is stored in a memory of the computer system.

Preferably, a local system of multi-dimensional pseudo-coordinates around a point on the geometric domain is defined, a plurality of weighting functions acting on said pseudo-coordinates are computed, and the patch operator is defined by applying the weighting functions.

According to an aspect of the method of present invention, a net architecture including a plurality of layer is used.

In this respect, at least one of the following layers may additionally be applied:
- a linear layer, including outputting a weighted linear combination of input data;
- a non-linear layer, including applying a non-linear function to input data;
- a spatial pooling layer, including:
  - determining a subset of points on the geometric domain;
  - for each point of said subset, determining the neighbours on the geometric domain; and
  - computing an aggregation operation on input data over the neighbours for all the points of said subset;

a covariance layer, including computing a covariance matrix of input data over all the points of the geometric domain;

a fully connected layer, including outputting a weighted linear combination of input data at all the points of the geometric domain, wherein each layer has input data and output data and output data of one layer are given as input data to another layer.

In one embodiment, the spatial pooling layer comprises aggregating of input data over the whole domain.

For instance, aggregating of input data comprises one of the following computation:

maximum computation;
average computation;
weighted average computation;
average of squares computation.

Two or more of layers are applied in sequence, and the output data of one layer in the sequence is given as input data to a subsequent layer in the sequence.

According to another aspect of the present invention, the method is adapted to learn the hierarchical features.

More particularly, one or more payer is applied and parameters of the applied layers may comprise one or more of the following:

weights of the linear layers;
templates of the intrinsic convolutional layers;
parameters of the weighting functions used to compute the patch operators in the intrinsic convolutional layer.

The parameters are determined by minimizing a cost function by means of an optimization procedure.

A plurality of cost functions may be defined and each cost functions associated to one or more application for which feature extraction is carried out.

In one embodiment of the method of the present invention, the input into the optimization procedure is a training set comprising:

a positive set of pairs of points on one or more geometric domains
a negative set of pairs of points on one or more geometric domains;

and wherein two identical copies of the hierarchical system configured with the same parameters are fed with pairs of points from the positive and negative sets, and wherein the optimization procedure tries to minimize the distance between the outputs corresponding to positive pairs and maximize the distance between the outputs corresponding to negative pairs.

According to a further aspect of the present invention, the method is adapted to process data in different geometric domains.

The geometric domain may be one of the following:
a manifold;
a parametric surface;
an implicit surface;
a mesh;
a point cloud;
an undirected weighted or unweighted graph;
a directed weighted or unweighted graph.

The multi-dimensional pseudo-coordinates have one or more dimensions and comprise one or more of the following:

geodesic coordinates;
diffusion coordinates;
intrinsic polar coordinates;
vertex degree;

According to still another aspect of the present invention, different weighting function may be used.

For instance, the weighting functions may be fixed functions.

However, the weighting functions may be parametric functions.

For instance, the weighting functions may be:
Gaussian kernels;
spline kernels;
trigonometric functions;
orthogonal basis functions.

In one embodiment, the weighting functions are sums of scaled trigonometric functions, and the parameters comprise the scale factors of the trigonometric functions.

In another embodiment, the weighting functions are sums of scaled Gaussian kernels, and the parameters comprise:

the scale factors of the Gaussian kernels;
the mean vectors of the Gaussian kernels, or a subset of elements thereof;
the covariance matrices of the Gaussian kernels, or a subset of elements thereof.

The covariance matrices of the Gaussian kernels are diagonal, and the subset of their elements comprises the diagonal elements.

According to another aspect of the invention concerning the patch, the patch operator inputs data on geometric domain and the point on the domain, and outputs the local representation of the data around the point, wherein the local representation is one or more of the following:

data represented in a local intrinsic polar system of coordinates;
data transformed by a windowed Fourier transform;
data weighted by anisotropic diffusion kernels.

In one embodiment, the patch operator outputs the local representation of input data in the local intrinsic polar system of coordinates, and an origin of angular coordinates of the local intrinsic polar system of coordinates is provided as side information extracted from the geometric domain or the data.

According to an aspect of this embodiment, the geometric domain may be a surface and the side information used to determine the origin of the angular coordinate of the local intrinsic polar system of coordinates at each point on the surface is a principle curvature direction at said point.

According to another aspect of this embodiment, the side information used to determine the origin of the angular coordinate of the local intrinsic polar system of coordinates at each point is a direction of a minimal or maximal absolute change of the data at said point.

In another embodiment, the patch operator outputs said local representation of input data in the local intrinsic polar system of coordinates, and the Fourier transform is applied with respect to angular coordinates, followed by an absolute value operation.

The computation of said correlation between the patch and the plurality of templates may further comprise the steps of:

rotating each template along angular coordinates;
computing the correlation of the patch with the rotated template;
taking a maximum operation over all the rotations.

The representation of input data in the local polar system of coordinates around the point on the geometric domain may further comprise the steps of:

computing an intrinsic distance from said point to all the other points on the geometric domain;

computing level sets of said intrinsic distance at a plurality of levels;
splitting a full angle at said point into a plurality of angular directions;
shooting rays emanating from said point along said directions perpendicular to said level sets.

More particularly, the intrinsic distance is one of the following or an approximation thereof:
geodesic distance;
diffusion distance;
commute time distance;
biharmonic distance.

The representation of input data may further comprises the steps of:
computing weights localized around level sets and rays;
computing weighted averages of input data with each of said weights.

According to the above mentioned aspect of the invention concerning the patch, the windowed Fourier transform of input data further comprises:
computing localized modulated atoms;
computing inner products of data with said atoms.

Preferably, the localized modulated atoms are heat kernels multiplied by Laplacian eigenfunctions.

More preferably, the method of claim 29, wherein the heat kernels are anisotropic.

The computation of local representation of input data around a point on geometric domain may further comprise the steps of:
computing a plurality of directed anisotropic heat kernels at said point, corresponding to a plurality of anisotropy constants and directions;
computing weighted averages of input data with said directed anisotropic heat kernels.

Still another aspect of the invention concerns raster scan.

The points of the geometric domain are in a grid, and wherein the step of applying the intrinsic convolutional layer on input data comprises applying a sliding window operation.

The sliding window operation further comprises:
determining the center point of the window;
extracting a block of points around the center point of the window;
defining the multi-dimensional pseudo-coordinates for each point of said block of points;
the plurality of weighting functions acting on the multi-dimensional pseudo-coordinates;
the weighting functions to define the patch operator extracting a local representation of the input data at the points of said block of points;
computing the correlation of the patch resulting from the extraction with a plurality of templates;
and moving the window to a next adjacent location.

At last, motifs may be processed according to another aspect of the present invention.

In this respect, the geometric domain is a directed graph, and further comprising the steps of:
inputting a plurality of graph motifs;
for each input graph motif
computing a new undirected weighted graph wherein the vertices are those of the input graph, and each edge is weighted by the occurrence of the graph motif;
computing said multi-dimensional pseudo-coordinates around each vertex of said undirected weighted graph;
computing said plurality of weighting functions acting on said pseudo-coordinates;
applying the weighting functions to define said patch operator extracting said local representation of the input data around said point on the geometric domain;
and outputting the correlation of said patch resulting from the extraction with said plurality of templates.

The multi-dimensional pseudo-coordinates computed for each undirected weighted graph comprise at least one of the following:
vertex degree;
geodesic distance from a vertex;
diffusion distance from a vertex;

The weighting functions may be diffusion kernels computed on the weighted undirected graphs for all the input graph motifs.

The diffusion kernels may comprise heat kernels with a plurality of time scales.

The diffusion kernels are anisotropic diffusion kernels.

Although the disclosure given above relates to process steps of the method of the present invention, the technical problem is also solved by a system for extracting hierarchical features adapted to implemented said method, and more particularly by a computer system. Therefore, the scope of protection of the present application also covers a system according to the appended claims. Further features and advantages of the method and system of the present invention are given in the following description, with reference to the annexed drawings just for exemplification purpose and without limiting the scope of protection of the present invention.

DETAILED DESCRIPTION

According to the idea of solution given above, a method is hereafter described for extracting hierarchical features from data defined on a geometric domain using an intrinsic convolutional neural network endowed with, at least, one intrinsic convolution layer, according to the present invention. The method is described with reference to the annexed drawings, given just for exemplification purpose and without limiting the scope of protection of the application.

The intrinsic convolution layer of the method of the present invention differs from the convolution layer of convolutional neural networks known in the prior art by the kind of domains onto which it is applicable. In particular, the convolution layer of prior art neural network is restricted to domains that can be modelled as Euclidean spaces (images, audio signals, etc.). Advantageously, the intrinsic convolution layer of the method of the present invention is adapted to deal with a wider category of domains that can be modelled as non-Euclidean spaces.

Figure 1:
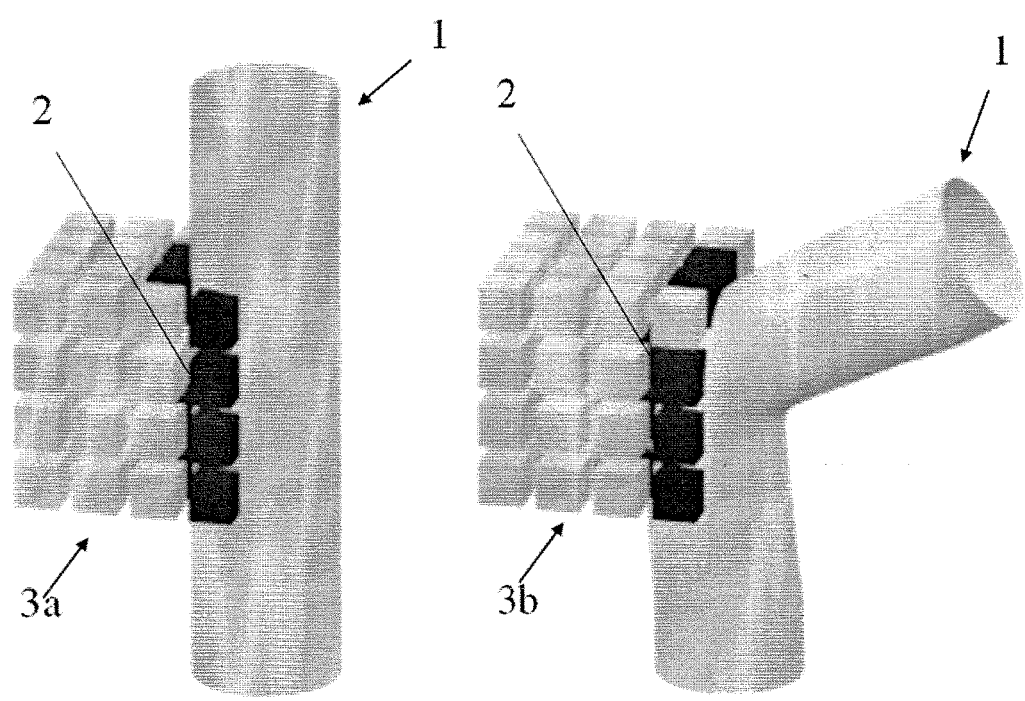
FIG. 1 represents the application of 3D filters on a cylinder before and after a deformation, according to a method of the prior art.
Figure 2:
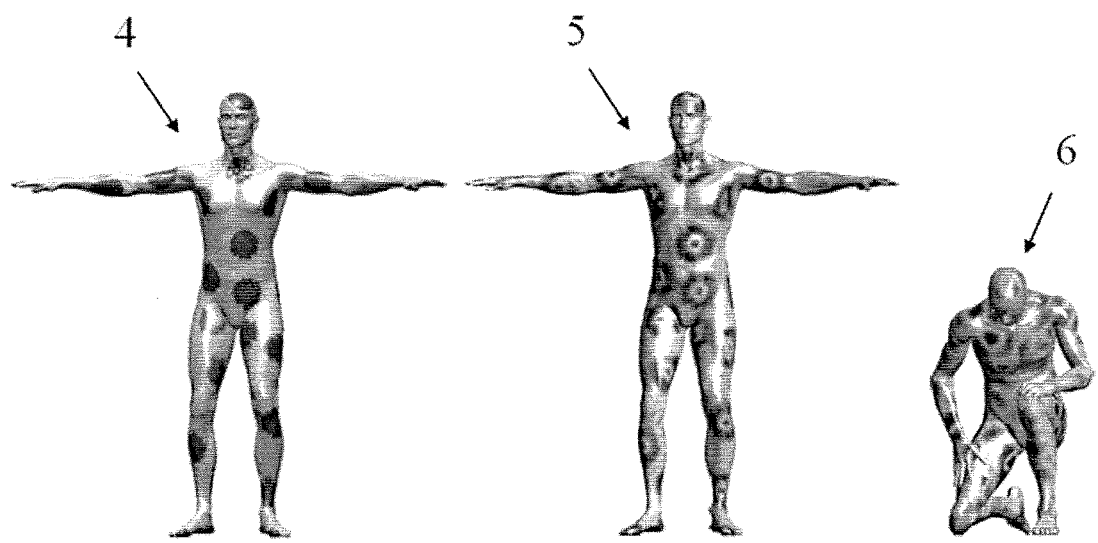
FIG. 2 represents the inability of spectral convolutional networks proposed in prior art to generalize the model learned on one domain to another domain.
Figure 3:
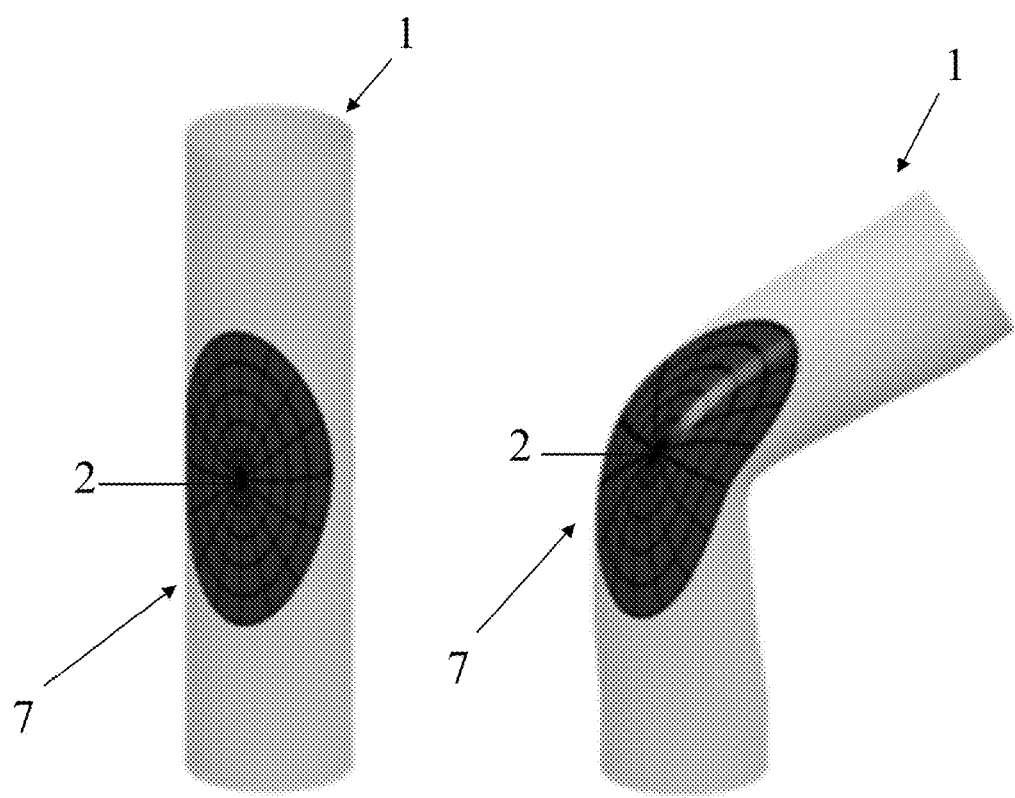
FIG. 3 represents the application of a patch on the cylinder of FIG. 1, according to the method of the present invention.

Advantageously, the method of the proposed invention works at an intrinsic level: the patch operator according to the present invention is defined on the geometric domain itself, as opposed to prior art methods using a Euclidean representation (embedding) of non-Euclidean domains. For instance, FIG. 3 schematically shows such advantage in the case where the geometric domain is represented as a cylinder 1 and the deformation is non-rigid: the patch 7 around a point 2 on the cylinder 1 follows the deformation, making the patch invariant to such deformations. In other words, the patch of the present invention is intrinsic.

The method according to the present invention is implemented in a computer system, i.e. the invention relates to a computer implemented method. The computer system may include a network. More particularly, any processing step is executed in means of said computer system, and any data in input to the method or provided as output thereof is stored in a memory of the computer system.

Hereafter, definitions of geometric domain, data defined on the geometric domain, intrinsic convolutional layer, patch operator, correlation with templates, local system of pseudo-coordinates, weighting functions and intrinsic convolutional neural network according to the method of the present invention are given.

Geometric Domain

Figure 4A:
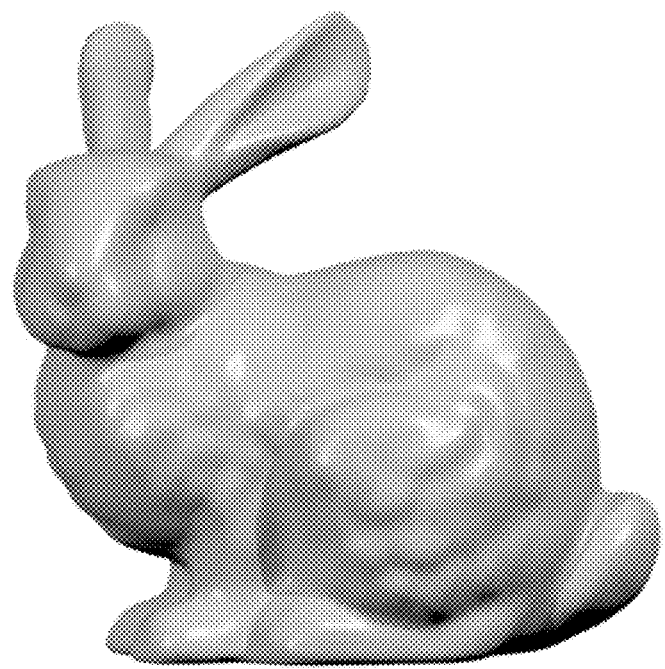
FIGS. 4A-4B schematically represents a geometric domain in the form of a 3D shape and a geometric domain in the form of a graph, respectively.
Figure 4B:
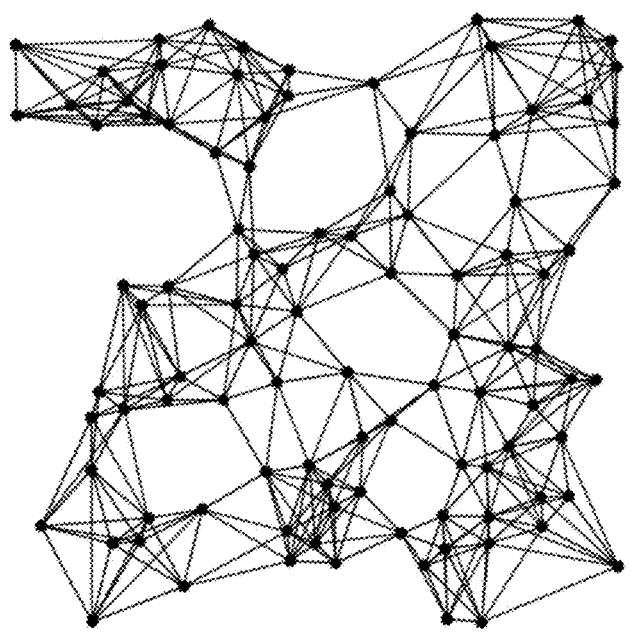

A geometric domain is a non-Euclidean space. Therefore, the meaning of the two expressions in the following description is the same. Geometric domains include, but are not limited to, manifolds and graphs. FIG. 4A shows an example of a manifold, while FIG. 4B shows an example of a graph.

A M-dimensional manifold X is a topological space that is locally homeomorphic (topologically equivalent) to a M-dimensional Euclidean space, referred to as the tangent space. For example, the Earth (spherical surface) is locally equivalent to a plane. Additionally, the manifold X can be endowed with an inner product on the tangent space (referred to as Riemannian metric), which provides a way to measure intrinsic distances on the manifold. In this case X is referred to as a Riemannian manifold.

What is commonly known as a three-dimensional (3D) shape in Computer Graphics and Vision can be modelled as two-dimensional (2D) manifold (surface), embedded in the 3D Euclidean space. The term 2D in this case refers to the intrinsic dimensionality of the manifold, while the term 3D refers to the (extrinsic) dimensionality of the embedding space.

Under some conditions, a M-dimensional manifold embedded in a D-dimensional Euclidean space (D>M) can be represented through a parameterization $y=f(x_1, \ldots, x_M)$, $f: \Omega \subseteq \mathbb{R}^M \to \mathbb{R}^D$, where $\Omega$ represents the parameter space. In the case when M=2, $y=f(x_1, x_2)$ is referred to as parametric surface. A relevant example of parametric surface is represented by raster scans, the kind of data acquired by 3D cameras such as Microsoft Kinect or Intel RealSense. Raster scans are parametric surfaces $y=f(x_1, x_2)$, where the function $f$ captures the depth y of the point $(x_1, x_2)$.

Another way of representing a M-dimensional manifold is through an implicit form as the M-dimensional level set of a function $f(x_1, \ldots, x_D)=0$. For example, a 2-dimensional surface can be represented as the level set of a function $f(x_1, x_2, x_3)=0$. A common choice for $f$ is the signed distance function of the 3D coordinate $(x_1, x_2, x_3)$ from the surface.

Geometric Domain Discretization

According to the present invention, the geometric domain defined in terms of one of the previous formulas is associated to a discrete approximation in order to be processed by the computer implemented method of the present invention.

Figure 5:
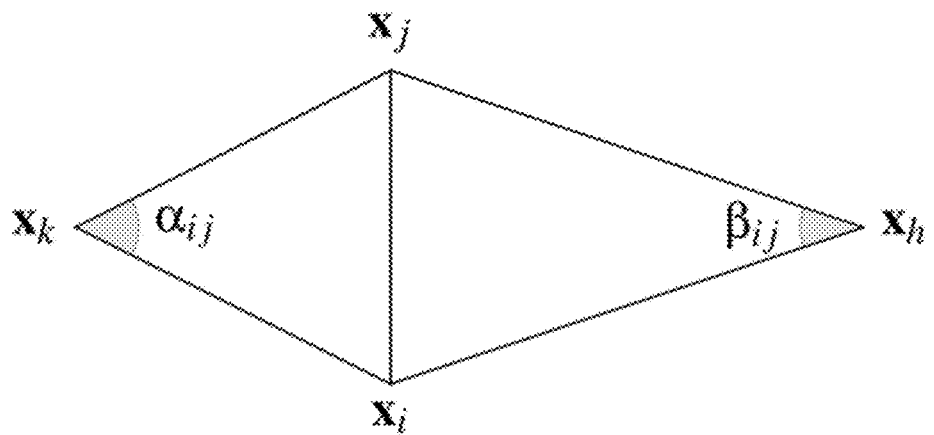
FIG. 5 schematically shows the terms involved in the definition of the LBO discretization.

For instance, the manifold X can be associated to a discrete approximation X by sampling N points $x_1, \ldots, x_N$ from X. The discrete approximation can be represented in different ways, including:

- a point cloud $V \in \mathbb{R}^{N \times 3}$ where for each point $x_i$, i= 1, ..., N, is specified a coordinate in $\mathbb{R}^3$ stored in the ith row of the matrix V;
- a triangular mesh (V,E,F), with vertices $V \in \mathbb{R}^{N \times 3}$ edges $E \in \{1, \ldots, N\} \times \{1, \ldots, N\}$, and faces $F \in \{1, \ldots, N\} \times \{1, \ldots, N\} \times \{1, \ldots, N\}$. A manifold triangular mesh is a triangular mesh where each interior edge $(i,j) \in E$ is shared by exactly two triangular faces $(i,j,k)$, $(i,j,h) \in F$, as represented in FIG. 5, and boundary edges belongs to exactly one triangular face.

Figure 6A:
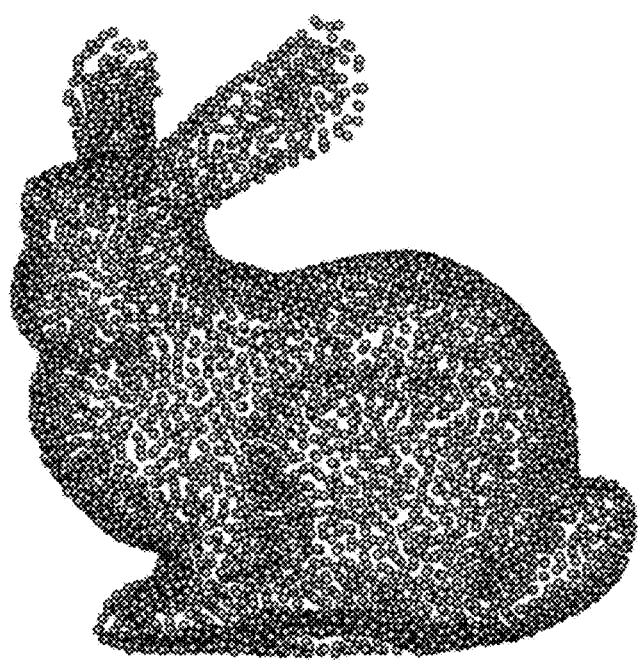
FIG. 6A-6B schematically represents a discrete representation of a geometric domain in the form of a manifold triangular mesh and a discrete representation of a geometric domain in the form of a point cloud, respectively.
Figure 6B:
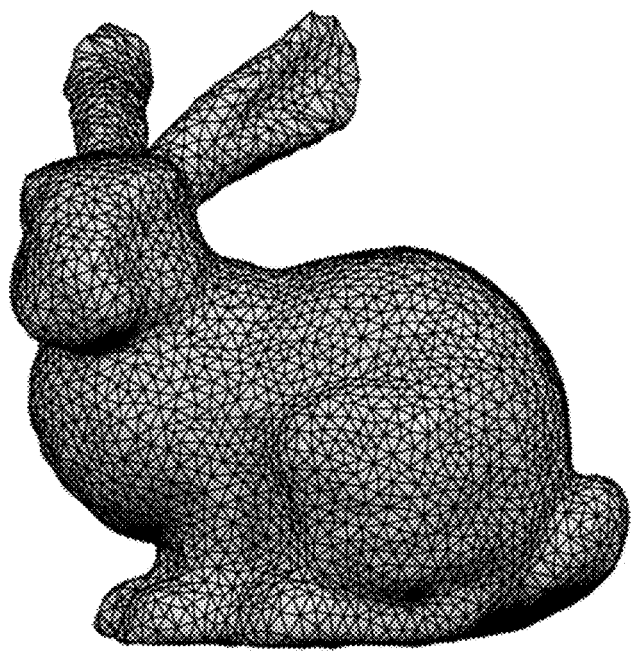

FIG. 6A schematically represents a discrete approximation of a geometric domain X in the form of a point cloud, and FIG. 6B a discrete approximation of the geometric domain X in the form of a manifold triangular mesh.

Graphs, instead, can be modelled as the pair (V,E), where V={1, ..., N} is the set of N vertices or nodes, and E∈{1, ..., N}×{1, ..., N} is the set of edges connecting the vertices. The main difference with the previous models resides in the fact that a graph is a purely topological notion, therefore the vertices does not need to be associated with any coordinate in $\mathbb{R}^3$. A weighted graph is a graph where each edge (i,j) is associated with some scalar weight $w_{ij} \in \mathbb{R}$. If such weights are not specified, the graph is called unweighted. A directed graph is a graph whose edges has a direction associated with them, i.e. the edge (i,j) is different form the edge (j,i). If such direction is not specified, the graph is called undirected.

Data Defined on Geometric Domain

According to the present invention, given the geometric domain X, data on X are defined in terms of functions $f: X \rightarrow \mathbb{R}^Q$, where Q represents the dimensionality of the data. When the geometric domain X is approximated with one of the previous discrete approximations X, data on X can be defined in terms of maps $f: V \rightarrow \mathbb{R}^Q$, where V are the vertices of the discretization X. If Q=1, than f is represented by the N-dimensional vector $f=(f(x_1), \ldots, f(x_N))^T$, where $\cdot^T$ is the transposition operator.

The steps of the method of the present invention are executed on data defined on the discrete approximation X of the geometric domain X.

Examples of such data comprises:
geometric information, such as the Gaussian curvature K $(x_i)=\kappa_m(x_i) \kappa_M(x_i)$, where $\kappa_m(x_i)$, $\kappa_M(x_i)$ represent the minimum and maximum curvature of the point $x_i \in X$ respectively;
color information, such as color texture in the RGB color space $f: V \rightarrow \mathbb{R}^3$, $x_i \rightarrow (R_i, G_i, B_i)$ where $R_i$, $G_i$, $B_i$ are scalars associated to the red, green and blue channels respectively;
semantic information, such as the meaning or the name of some parts of the shape. If, for instance, we consider the 3D shape of a human body, the function $f: \overline{V} \subseteq V \rightarrow \mathbb{N}$ can map a sparse set of vertices $\overline{V}$ to their anatomical counterpart (knee, shoulder, ... ) by associating to the vertex $x_i \in \overline{V}$ a natural number as a label corresponding to the anatomical part. If we model a social network with a graph, examples of semantic information can be the genre of the people corresponding to the nodes ($f: V \rightarrow \{0, 1\}$, where 0 corresponds to male and 1 to female) or their favorite film ($f: V \rightarrow \mathbb{N}$, where the films are labeled with natural numbers) or more generally, any function $f: V \rightarrow \mathbb{R}$.

Data on the geometric domain X may be defined also through spectral properties of the Laplace-Beltrami operator (LBO) $\Delta_X f = -\text{div}_X(\nabla_X f)$, a generalization of the classical Laplacian to non-Euclidean spaces. The LBO is intrinsic, i.e. it does not depend on the embedding of the manifold. As a result, it is invariant to isometric (metric preserving) deformations of the manifold. If, for instance, the manifold X represents a human body, then the LBO and all the quantities derived from it are invariant to e.g. pose changes (different positions of arms, legs, ... ). On a compact manifold, the LBO admits an eigendecomposition $\Delta_X \phi_k = \Lambda_k \phi_k$ with real eigenvalues $\{0 = \lambda_1 \leq \lambda_2 \leq \ldots \}$. The set of the eigenvalues $\{\lambda_k\}_{k \geq 1}$ is also known as the spectrum of the LBO. The corresponding eigenfunctions $\{\phi_k\}_{k \geq 1}$, form an orthonormal basis on $L^2(X)$, which is a generalization of the Fourier basis to non-Euclidean domains.

Any function $f \in L^2(X)$ can be represented as the Fourier series $f(x) = \Sigma_{k \geq 1} \langle f, \phi_k \rangle_{L^2(X)} \phi_k(x)$, where the analysis $\hat{f}_k = \langle f, \phi_k \rangle_{L^2(X)}$ can be thought as the forward Fourier transform and the synthesis $\Sigma_{k \geq 1} \hat{f}_k \phi_k(x)$ represents the inverse one. The eigenvalues $\{\lambda_k\}_{k \geq 1}$ plays the role of frequencies.

The generalized convolution of $f, g \in L^2(X)$ can be defined by analogy to the classical case as the inverse transform of the product of forward transforms, $(f*g)(x) = \Sigma_{k \geq 1} \hat{f}_k \hat{g}_k \phi_k(x)$ and is, in general, non shift-invariant.

The LBO can be used to describe physical processes on geometric domains. For instance, the heat diffusion on a geometric domain X can be described through the isotropic heat equation:

$$\begin{cases} f_t(x, t) = \Delta_X f(x, t), \\ f(x, 0) = f_0(x), \end{cases}$$

where $f(x,t)$ denotes the amount of heat at point x and time t and $f_0(x)$ is the initial heat distribution. The solution of the previous equation can be obtained by convolution between the initial condition $f_0$ and the heat kernel $h_t(x,y)$, i.e. $f(x,t) = h_t(x,y) * f_0(x)$. In the spectral domain, the heat kernel has the closed form expression $h_t(x,y) = \Sigma_{k \geq 1} e^{-t \lambda_k} \phi_k(x) \phi_k(y)$.

The isotropic heat equation assumes that the heat conduction properties of the manifold are constant at every point. A more general diffusion equation has the form $f_t(x,t) = -\text{div}_X(x) \nabla_X f(x,t))$, where D(x) is the thermal conductivity tensor (in the discrete settings, the operator D(x) can be represented as the 2×2 matrix D) applied to the gradient in the tangent plane. The thermal conductivity tensor allows modelling heat flow that is position- and direction-dependent; the corresponding heat diffusion equation in this case is called anisotropic. The eigendecomposition and the heat kernel associated with the anisotropic LBO $\overline{\Delta}_X = -\text{div}_X(D(x) \nabla_X f(x,t))$ are defined in the same way as the ones for the LBO one. We will refer to them as anisotropic eigenfunctions and anisotropic heat kernel respectively.

On a discrete approximation X of the geometric domain X, the LBO $\Delta_X$ can be defined as an N×N matrix $L = A^{-1} W$, where $$w_{ij} = \begin{cases} \dfrac{\cot \alpha_{ij} + \cot \beta_{ij}}{2}, & (i, j) \in E \\ -\sum_{k \neq i} w_{ik}, & i = j \\ 0, & \text{else} \end{cases}$$

where $\alpha_{ij}$, $\beta_{ij}$ denotes the angles $\angle ikj$, $\angle ihj$ of the triangles sharing the edge ij, and $A = \text{diag}(a_1, \ldots, a_n)$ with $$a_i = \frac{1}{3} \sum_{jk: ijk \in F} A_{ijk}$$

being the local area element at vertex i and $A_{ijk}$ denoting the area of the triangle ijk. FIG. 5 schematically shows the terms involved in the definition of the LBO discretization.

The first K≤N eigenvectors and eigenvalues of L are computed by performing the generalized eigendecomposition $W\Phi=A\Phi\Lambda$, where $\Phi=(\phi_1,\ldots,\phi_k)$ is an N×K matrix containing as columns the discretized eigenfunctions and $\Lambda=\text{diag}(\lambda_1,\ldots,\lambda_k)$ is the diagonal matrix of the corresponding eigenvalues.

Through the eigendecomposition of the LBO it is possible to define meaningful features f: $V \to \mathbb{R}^Q$, that can be considered as input data for the method of the present invention. A relevant category of them is represented by the known spectral descriptors. For instance, global point signature is defined as $f(x)=(\lambda_1^{-1/2}\phi_1(x),\ldots,\lambda_Q^{-1/2}\phi_Q(x))$. More in general, spectral descriptors take the generic form of the diagonal of a parametric kernel diagonalized by the LBO eigenbasis. More specifically, at each point $x \in X$, a spectral descriptor can be constructed as $$f(x)=\Sigma_{k\geq 1}\tau(\lambda_k)\phi_k^2(x),$$

where $\tau(\lambda)=(\tau_1(\lambda),\ldots,\tau_Q(\lambda))$ represents a bank of transfer functions. By changing the transfer functions $\tau(\lambda)$ different shape properties are described or emphasized. Relevant examples include:

heat kernel signature (HKS) considers low-pass transfer functions $\tau_t(\lambda)=e^{-t\lambda}$ for various values of the parameter $t \in \{t_1,\ldots,t_Q\}$. The resulting descriptor gives rise to the autodiffusivity function $h_t(x,x)$ (diagonal of the heat kernel), whose physical interpretation is the amount of heat remaining at x after time t;

wave kernel signature (WKS) considers bans-pass transfer functions $\tau_v(\lambda)=e^{((\log v - \log \lambda)/2\sigma^2)}$ for various values of the parameter $v=\{v_1,\ldots,v_Q\}$. The physical interpretation of WKS is the probability to find a quantum particle at point x, given that it has an initial log-normal energy distribution with mean value v and variance α;

geometry vector instead considers $\tau_q(\lambda)=\beta_q(\lambda_k)$, q=1,...,Q, where $\beta=\{\beta_1,\ldots,\beta_Q\}$ represents a B-spline basis on the spectrum of the LBO. Therefore each component $f_q$ of the descriptor, q=1,...,Q, looks like $f_q(x)=\Sigma_{k\geq 1}\beta_q(\lambda_k)\phi_k^2(x)$.

Intrinsic Convolution Layer

According to the present invention, the convolution operation on the geometric domain X between said input data $f$ and a multitude of learnable templates g is defined by following the interpretation of convolution as correlation with a template. Said convolution operation and the relative convolution layer are referred to as intrinsic convolution and intrinsic convolution layer, to avoid ambiguities with prior art convolution operation and convolution layer, which are limited to be applied on Euclidean domains only and are not invariant to non-rigid deformations.

The intrinsic convolution layer comprises the steps of:

extracting a local representation $P(x)f$ of the input data $f$ around a point $x \in X$. Such local representation is hereafter referred as patch and the operator $P(x)$ that extract the patches from the geometric domain X is referred as patch operator;

computing the correlation between the patches with a plurality of templates.

Patch Operators

According to an aspect of the present invention, the patch operator may be defined in different ways. In particular, in the following description, three different patch operators are defined through which, respectively:

data can be transformed by a windowed Fourier transform;

data can be weighted by Gaussians defined on a local polar system of coordinates;

data can be weighted by anisotropic heat kernels.

The patch operator takes in input data on the geometric domain and a point on said domain, and outputs the local representation of said input data around said point, wherein the local representation, depending on which operator is considered, is data transformed by a windowed Fourier transform, data weighted by Gaussians on a local intrinsic polar system of coordinates, or data weighted by anisotropic diffusion kernels.

Advantageously, the patch operator to be used is selected depending on the kind of geometric domain on which data are defined. Moreover, depending on which patch operator is used, the step of correlating the patch with a template is adapted.

In the following, details of each of the three patch operators and how to correlate the extracted patches with a template are described.

Patch Operator Via Windowed Fourier Transform

On the base of the idea that convolution in the spatial domain corresponds to a multiplication in the frequency domain, the method of the present invention defines the patch operator by applying a vertex-frequency analysis in terms of a windowed Fourier transform (WFT) of the input data.

In such settings, the patch operator takes in input data on the geometric domain and a point on said domain, and outputs the local representation of said input data around said point by means of a WFT.

The computation of the patch operator using the WFT requires two steps:

the computation of the localized modulated atoms;

the computation of inner products with said atoms.

In the Euclidean domain, the classical WFT analyzes the frequency content of a signal that is localized by means of a local window h. Given a function $f \in L^2(\mathbb{R})$, and a window h localized at zero, the WFT is computed as $(Sf)(x,\omega)=\int_{\mathbb{R}} f(y)h(y-x)e^{-i\omega y}dy$. The WFT is a function of the spatial location of the window x and the modulation frequency ω. The choice of the window h allows to control the tradeoff between spatial and frequency localization, in the sense that narrower windows result in worse frequency resolution. The WFT can also be represented as an inner product with said translated and modulated window h, $(Sf)(x,\omega)=\langle f, M_\omega T_x h\rangle_{L^2(\mathbb{R})}$, where $T_x$ represent the translation operator and $M_\omega$ the modulation operator respectively.

The method of the present invention extends the notion of WFT to geometric domains by defining the translation operator as $(T_y f)(x)=\Sigma_{k\geq 1}\hat{f}_k \phi_k(y)\phi_k(x)$ and by defining the modulation operator as $(M_k f)(x)=\phi_k(x)f(x)$, where $\hat{f}$ is the Fourier transform of the input data $f$ and $\{\phi_k\}_{k\geq 1}$ can be the isotropic LBO eigenfunctions or the anisotropic LBO eigenfunctions.

Figure 7:
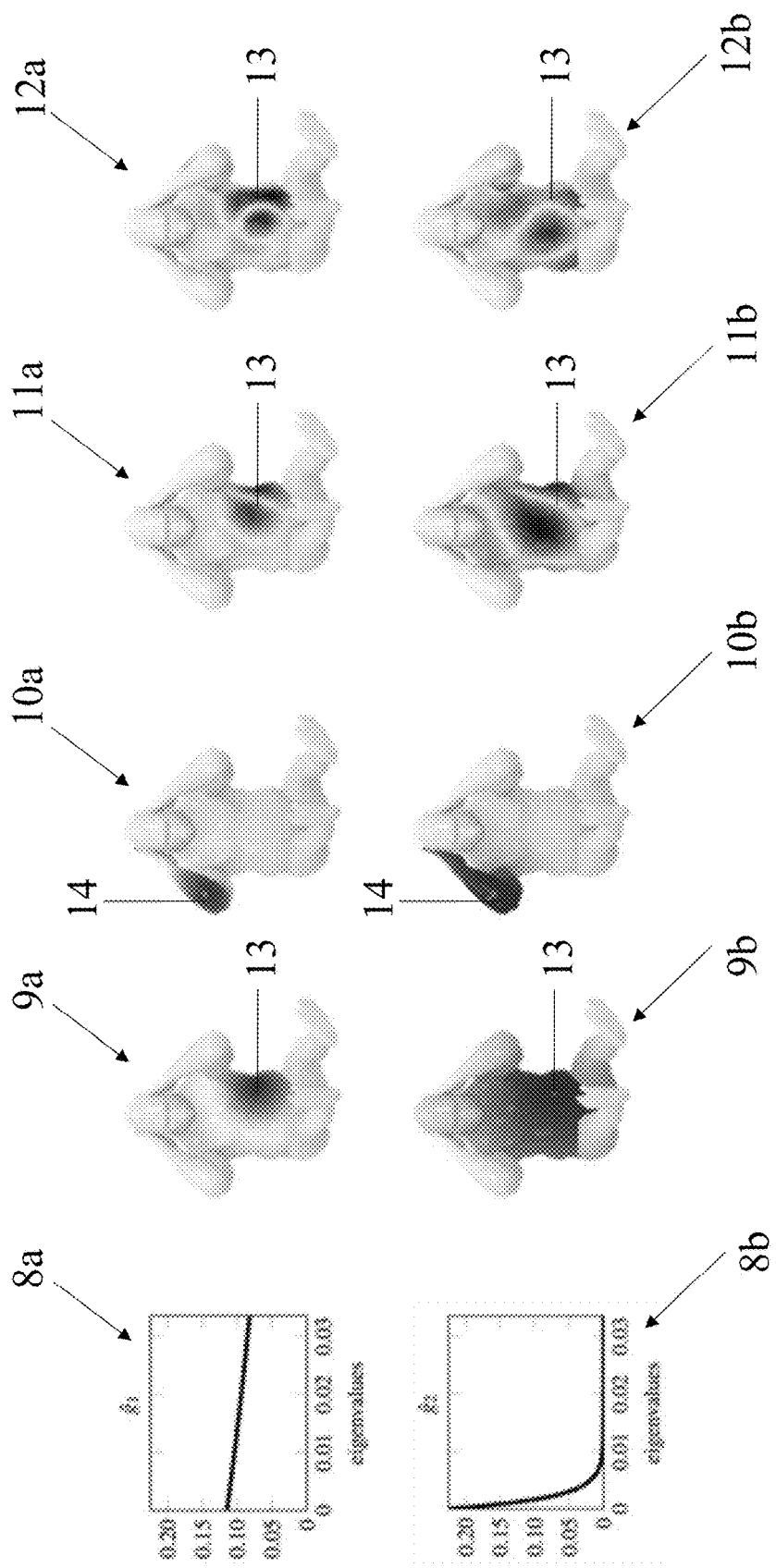
FIG. 7 schematically represents the translation and modulation operators for the definition of patch in the form of WFT analysis for two different windows, according to the method of the present invention.

FIG. 7 schematically represents the translation and modulation operators for the definition of patch in the form of WFT analysis for two different windows 8a, 8b. In particular, with reference numbers:

9a (respectively, 9b) is indicated the translation operator centered around the point 13 and corresponding to the window 8a (respectively, 8b);

10a (respectively, 10b) is indicated the translation operator centered around the point 14 and corresponding to the windows 8a (respectively, 8b);

11a, 12a (respectively, 11b, 12b) are indicated modulation operators for the point 13 and corresponding to the window 8a (respectively, 8b);

where the values of the functions corresponding to the translation and modulation operator are represented as colors on the geometric domain.

Combining the two operators together, we obtain a modulated and translated window $M_k T_x h$, called atom. On geometric domains, the atoms can be defined as $M_k T_x h = \phi_k(y) \Sigma_{k \geq 1} \hat{h}_k \phi_k(x) \phi_k(y)$. Therefore, on geometric domains the WFT takes the form $(Sf)(x,k) = \langle f, M_k T_x h \rangle_{L^2(X)} = \Sigma_{l \geq 1} \hat{h}_l(x) \langle f, \phi_l \phi_k \rangle_{L^2(X)}$.

The patch operator corresponding to the point $x \in X$ can be defined by collecting the output of the WFT corresponding to the first j=1, . . . , J frequencies, i.e. $P_j(x)f = ((Sf)(x,j), \ldots, (Sf)(x,J))$.

If a discrete approximation X of the geometric domain X is provided, the WFT can be computed as $Sf = (f \square \Phi)^T A \Phi (\hat{h} \square \Phi^T)$, where $\hat{h}$ is the K-dimensional vector representing the window in the frequency domain, f is the N-dimensional vector representing the input function, A is the diagonal matrix containing the local area elements, and $(a \square B)_{ij} = a_i B_{ij}$ denotes the known Hadamard product, i.e. element-wise multiplication of a vector and a matrix, replicating the vector along the second dimension of the matrix. The resulting WFT is a matrix of size K×N.

If the patch operator is provided by means of the WFT, the intrinsic convolution operation can be defined as $(f*g)(x) = \Sigma_{i=1}^I \Sigma_{j=1}^J g_{qij} |(Sf_i)(x,j)|$, where $f = (f_1(x), \ldots, f_I(x))$ represents the I-dimensional input function, q=1, . . . , Q corresponds to the output dimension, g is the learnable template and the absolute value is considered to reduce the effect of the LBO eigenfunctions sign ambiguities. In this way, the intrinsic convolution is reduced to a simple tensor multiplication.

Advantageously, according to our invention, the Fourier transform of the window $\hat{h}$ can not only be a fixed filter, but can also be parameterized in some fixed interpolation basis in the frequency domain (e.g. the B-spline basis $\beta = \{\beta_1, \ldots, \beta_Q\}$ on the LBO spectrum), e.g. $\hat{h}_i(\lambda) = \Sigma_{m=1}^M b_{im} \beta_m(\lambda)$, i=1, . . . , I, where the I×M matrix $(b_{im})$ of learnable weights defines the windows. In such case, the I×M window parameters $b_{im}$, i=1, . . . , I, m=1, . . . , M are considered additional parameters of the intrinsic convolution layer and can be optimized during the learning procedure.

Patch Operator Via Gaussians on a Local System of Intrinsic Polar Coordinates

According to an aspect of the proposed invention, the patch operator computes a local representation of the data $f$ around each input vertex of the geometric domain by interpolating the data $f$ with fixed Gaussian weights on a local system of intrinsic polar coordinates previously extracted.

More in details, given a point $x \in X$, such patch operator is constructed by the following steps:

construction of a local system of intrinsic polar coordinates on the geometric domain X, i.e. a bijection $\Omega(x): N(x) = B_{\rho_{max}}(x) \to [0, \rho_{max}] \times [0, 2\pi)$ that maps a local neighborhood $N(x)$ of x to a system of intrinsic polar coordinates $(\rho, \theta)$. This step is agnostic to the data $f$. FIG. 7 schematically shows how such local polar system of coordinates 16 around a point 15 looks on a 3D shape representing a man 17.

construction of interpolation weights P(x) for the data $f$ on such polar system of coordinates, i.e. $(P(x)f)(\rho, \theta) = (f \circ \Omega^{-1}(x))(\rho m \theta)$. We will refer to P(x) as the patch operator and to $P(x)f$ as the patch on the geometric domain X centered at point $x \in X$.

The construction of the local system of intrinsic polar coordinates includes the following steps:

extraction of intrinsic distance from the point $x \in X$ to the points $y \in N(x)$ in a neighbor of $x \in X$. Examples of intrinsic distances include:

geodesic distance, which measures the length of the shortest path along the geometric domain X between two points $x, y \in X$. The main drawbacks of such distance are that it requires a mesh structure and it is sensitive to topological noise (e.g. holes in the geometric domains caused by an imprecise acquisition of the 3D geometry);

diffusion distance, which measures the distance between two points $x \in X$, $y \in N(x)$ by the diffusion process $d_X^2(x,y) = \Sigma_{k \geq 1} e^{-t\lambda_k} (\phi_k(x) - \phi_k(y))^2$, where $\phi_k, \lambda_k$ are the kth eigenfunction and eigenvalue of the LBO respectively;

commute time distance, which measures the distance between two points $x \in X$, $y \in N(x)$ as the average of the time a random walker would take to travel from x to y and back. The commute time distance can be represented in terms of eigenfunctions and eigenvalues of the LBO as $$d_X^2(x, y) = \sum_{k \geq 1} \frac{(\phi_k(x) - \phi_k(y))^2}{\lambda_k};$$

biharmonic distance, measures the distance between two points x, $y \in X$ as $d_X(x,y) = g(x,x) + g(y,y) - 2g(x,y)$, where $$g(x, y) = \sum_{k \geq 1} \frac{\phi_k(x) \phi_k(y)}{\lambda_k^2}$$

is the Green's function of the biharmonic operator $\Delta^2$. When represented in terms of eigenfunctions and eigenvalues of the LBO, the biharmonic distance formula differs from the commute time distance one only slightly:

$$d_X^2(x, y) = \sum_{k \geq 1} \frac{(\phi_k(x) - \phi_k(y))^2}{\lambda_k^2};$$

computation of the radial coordinates as the $\rho$-level set $\{y : d_X(x,y) = \rho\}$ of one of the previous intrinsic distances (geodesic, diffusion, . . . ) for $\rho = [0, \rho_{max}]$. We call $\rho_{max}$ the radius of the local patch. Empirically $\rho_{max}$ can be chosen equal to some small percentage of the intrinsic distance diameter, e.g. $\rho_{max} \approx 1\%$ of the geodesic diameter;

computation of the angular coordinates as a set of geodesics $\Gamma(x, \theta)$ emanating from x in direction $\theta$ such that they are perpendicular to the p-level set described in the previous step for $\theta = [0, 2\pi)$. If instead, the origin of the angular coordinates of the local system of intrinsic polar coordinates is provided as a side information extracted from the geometric domain in term of a direction v, the angular coordinate $\theta$ measures the angle with respect to such given direction v. For instance, v can be chosen as the principal curvature direction of the geometric domain X in the point x∈X.

Figure 8:
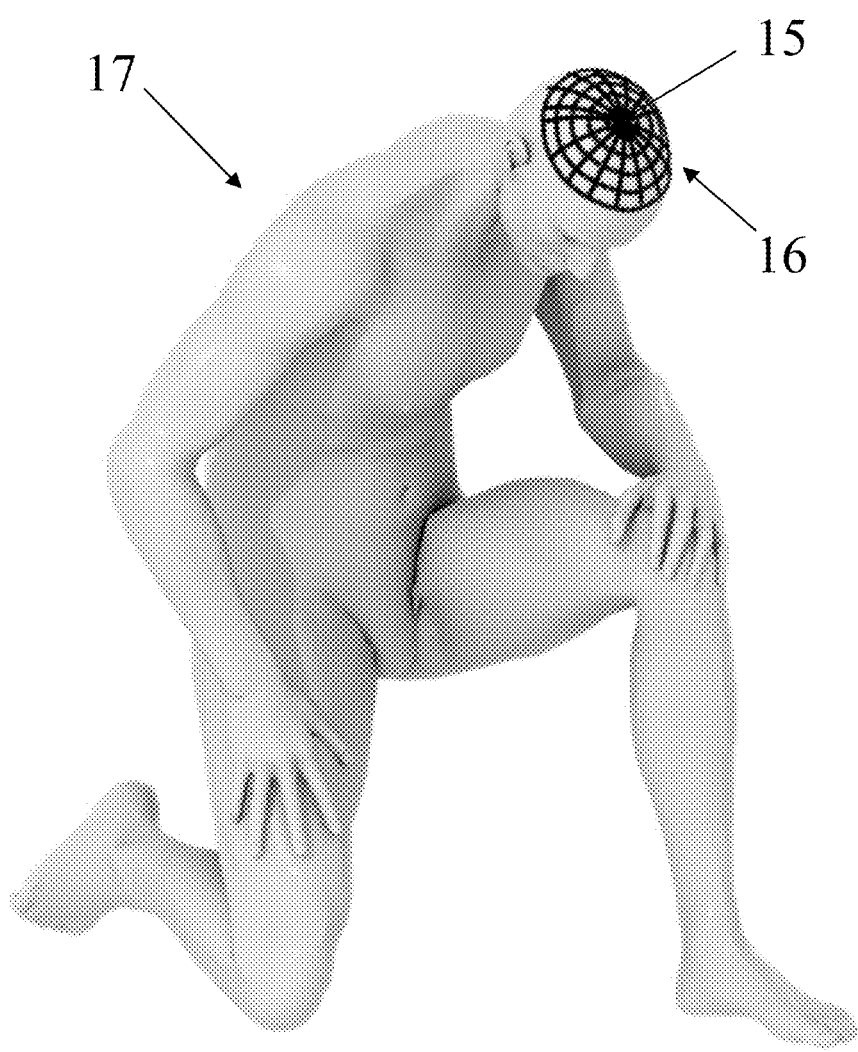
FIG. 8 schematically shows a patch in the form of a local polar system of coordinates on a 3D shape, according to the method of the present invention.

The previous steps are repeated for all the point of the geometric domain X. In particular, FIG. 8 shows the resulting patch when the steps above are executed starting from the point 15 and the geometric domain is a man 17.

Figure 9A:
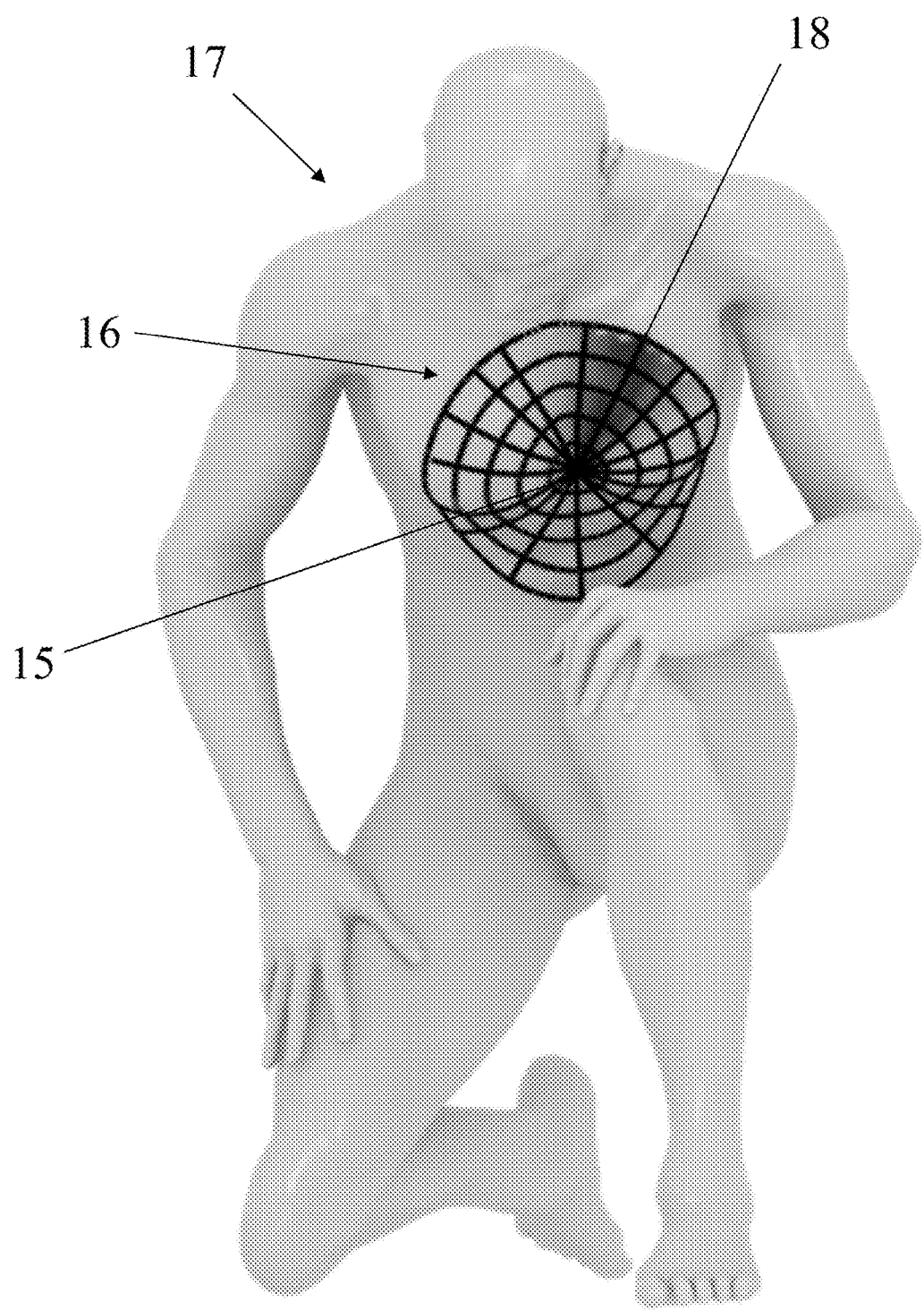
FIGS. 9A and 9B schematically represents the radial interpolation weights and the angular interpolation weights, according to the method of the present invention.
Figure 9B:
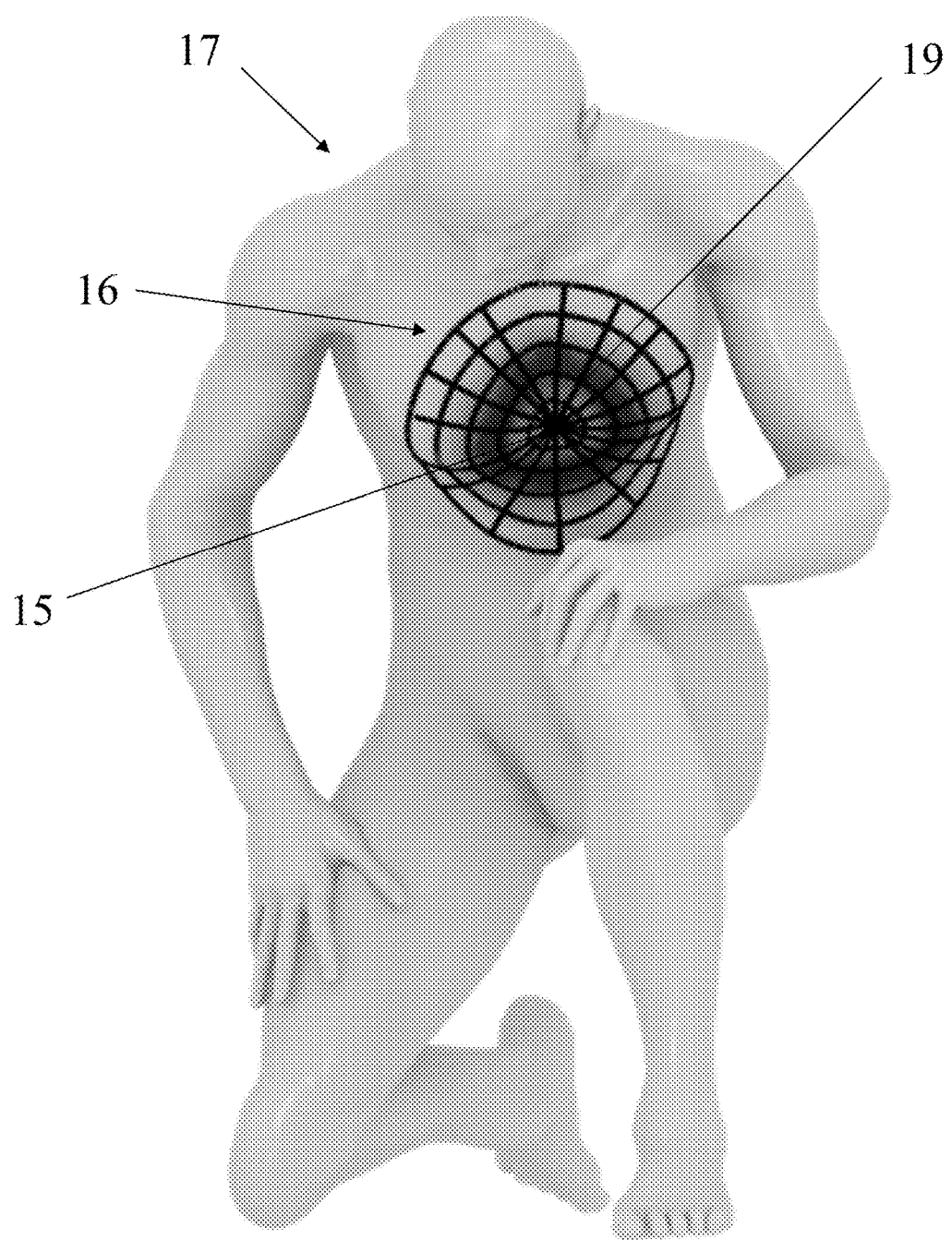

Given the angular and radial coordinates (ρ, θ) corresponding to the point x∈X, the patch operator P (x) can be obtained as:

$$(P_j(x)f)(\rho,\theta) = \int_X w_j(\rho,\theta)f(y)dy, j=1,\ldots,J,$$

where the interpolation weights $w_j$ can be defined as the Gaussians:

$$w_j(\rho,\theta) = \frac{w_\rho(x,y)w_\theta(x,y)}{\int_X w_\rho(x,y)w_\theta(x,y)dy},$$

where $w_\rho(x,y)$, $w_{\theta(x,y)}$ are the radial and angular interpolation weights respectively. For instance, the radial interpolation weights can be defined as a Gaussian $w_\rho(x,y) \propto e^{-(d_X(x,y)-\rho)^2/\sigma_\rho^2}$ of the intrinsic distance from x, centered around the radius ρ. FIG. 9A schematically represents the radial interpolation weights for the point 15 along the radius 18, where the weights are represented in different grey scales. The angular interpolation weights can be defined as a Gaussian $w_\theta(x,y) \propto e^{-d_X^2(\Gamma(x,\theta),y)/\sigma_\theta^2}$ the point-to-set distance $d_X^2(\Gamma(x,\theta),y) = \min_{z \in \Gamma(x,\theta)} d_X(z,y)$, where Γ(x,θ) represents a geodesic emanating from x in the direction θ. FIG. 9B schematically represents the angular interpolation weights for the point x along the angle 19, where the weights are represented in different grey scales. The previous steps are repeated for all the point of the geometric domain X.

Figure 10A:
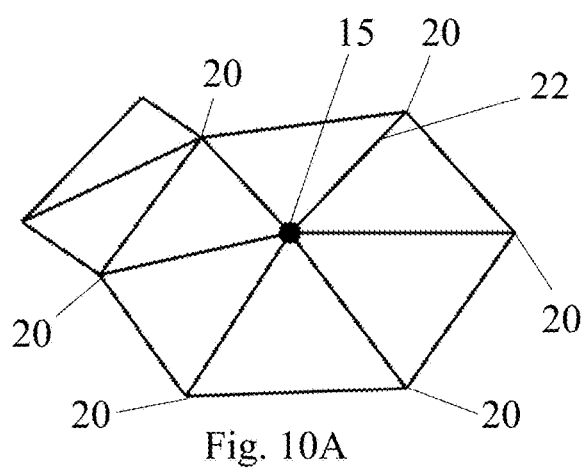
FIGS. 10A-10F schematically represent the patch discretization when the patch is in the form of the local polar system of coordinates, according to the method of the present invention.

If the geometric domain is approximated with a manifold triangular mesh, the local system of coordinates previously described is sampled at $N_\theta$ angular and $N_\rho$ radial bins, obtaining in this way a discrete local system of coordinates. More in details, with reference to FIGS. 10A-10F, the discretization procedure involves the following steps:
  start with a vertex 15, partition the 1-ring 20 of the vertex 15 by $N_\theta$ rays 21 into equiangular bins, and align the first ray 21a with one of the edges 22, as illustrated in FIG. 10A;
  propagate ray 21b into adjacent triangle 23 using an unfolding procedure (similar to the known one used in fast marching algorithm; as illustrated in FIG. 10B-10F), thus producing the poly-lines 24 that form the angular bins;
  create radial bins as level sets of the intrinsic distance function. If the chosen intrinsic distance is the geodesic one, then it can be discretized using the fast marching algorithm.

As a consequence, the patch operator P(x) can be represented in the discrete domain as a $N_\theta N_\rho N \times N$ matrix P applied to the data f on the mesh and producing the patches at each vertex. Conveniently, the matrix P is very sparse since only the values of the function at a few nearby vertices contribute to each local polar bin.

Once the patch operator P(x) is computed, the intrinsic convolution of $f \in L^2(X)$ with a template g(ρ,θ) is defined as $(f*g)(x) = \int_0^{2\pi}\int_0^{\rho_{max}} g(\rho,\theta)(P(x)f)(\rho,\theta)d\rho d\theta$, where g(ρ,θ) is a template (or filter) applied on the patch (i.e. expressed in the same local system of intrinsic polar coordinates than the patch P(x)f).

Figure 10B:
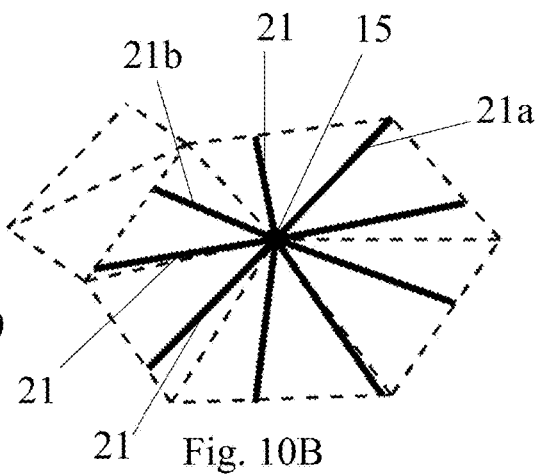
Figure 10C:
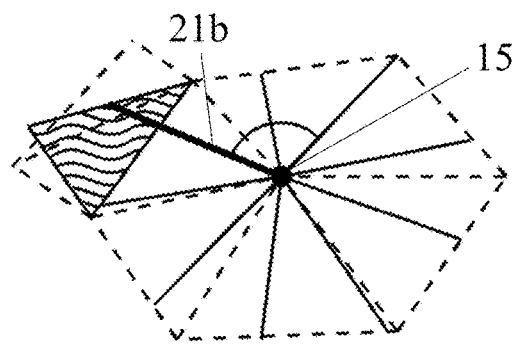
Figure 10D:
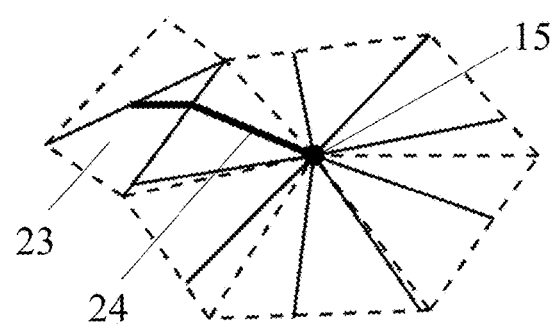
Figure 10E:
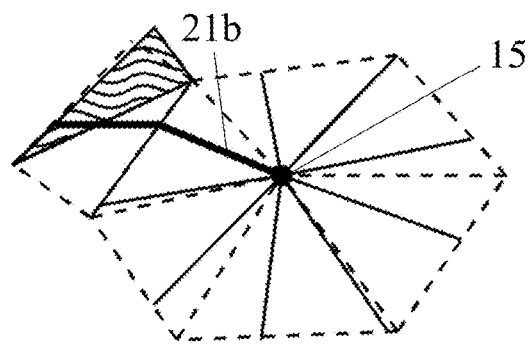
Figure 10F:
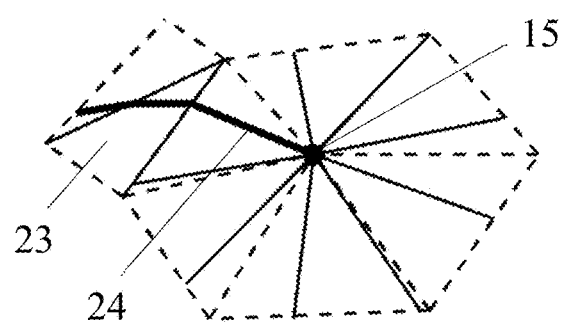
Figure 11A:
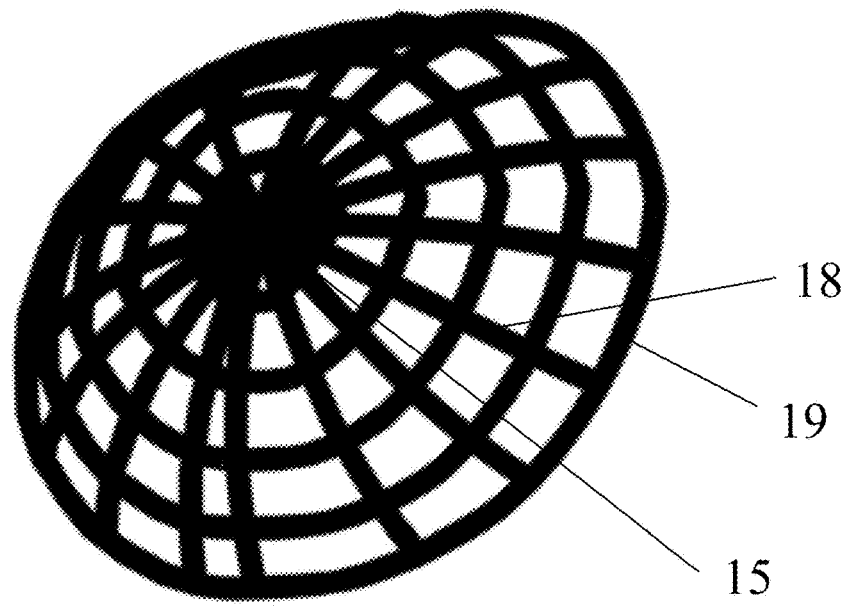
FIG. 11A schematically represents the patch of FIG. 8 separately from the 3D shape, and FIG. 11B schematically represents the patch of FIG. 11A after a conversion into a form adapted to be correlated with a template, according to the method of the present invention.
Figure 11B:
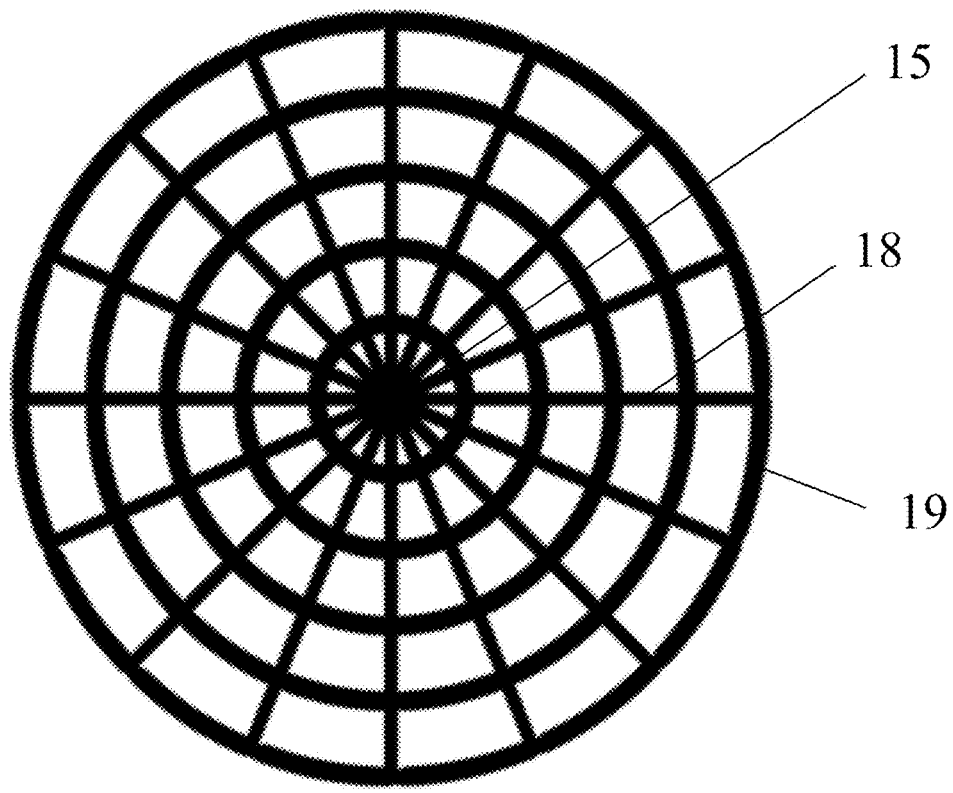
Figure 12:
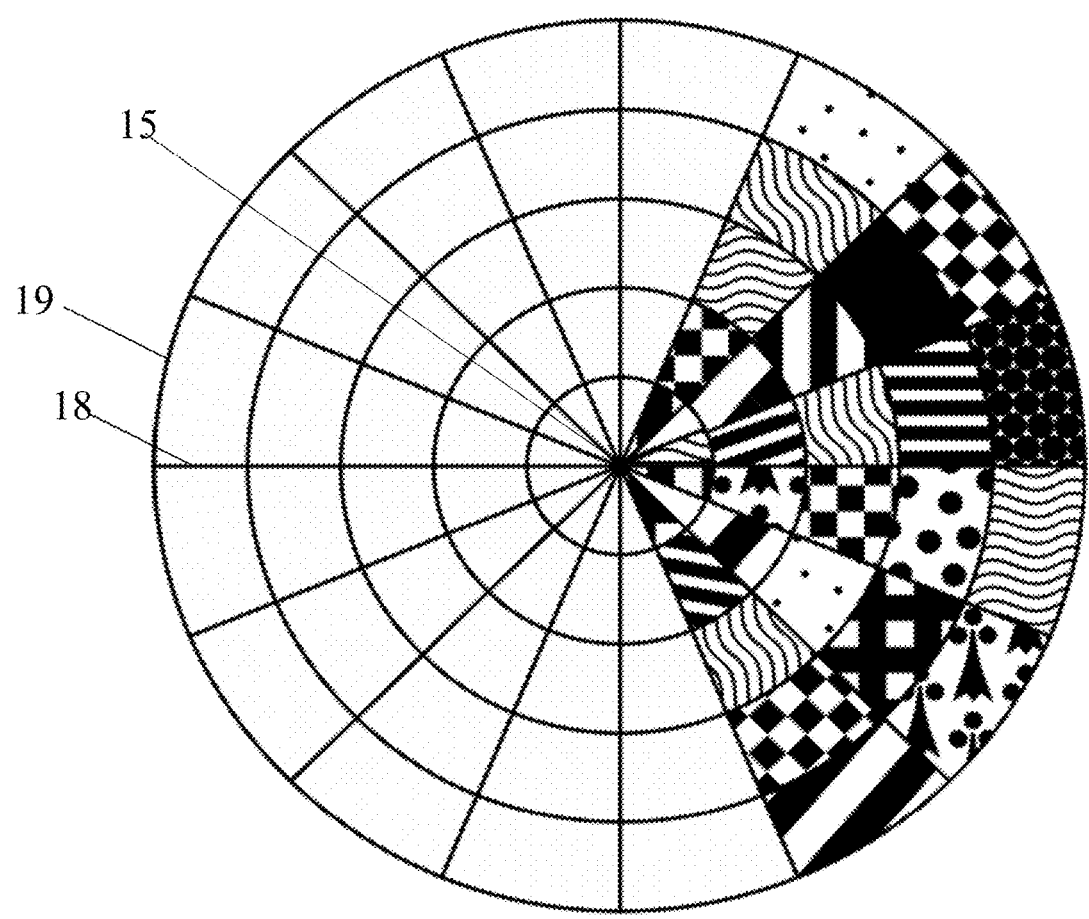
FIG. 12 schematically represents the patch of FIG. 11B wherein different values for each bin are represented with different patterns, according to the method of the present invention.

FIG. 11A shows the patch 16 of FIG. 8 in the form of a local polar system of coordinates defined on the geometric domain (without explicitly showing the man shape 17) and FIG. 10B shows the same patch 16 after being mapped to a traditional polar system of coordinates. The operation of correlating the patch with a template previously described is executed among traditional polar system of coordinates like the one represented in FIG. 11B. In FIGS. 11A and 11B the interpolation weights are not shown for clarity of representation. In FIG. 12 such interpolation weights are shown as different patterns for each of the bins of the local polar system of coordinates as defined above. The patterns cover only a part of the patch for clarity reasons, in the actual method of the present invention the patterns cover all the bins of the patch.

Angular Ambiguity

If the angular coordinate of the local system of intrinsic polar coordinates is computed by ray-shooting at equispaced angles, the definition of the intrinsic convolution through the patch operator P(x) previously described suffers from angular coordinate ambiguity. In other terms, the filter can be rotated by arbitrary angle Δθ: $(f*g)(x) = \int_0^{2\pi}\int_0^{\rho_{max}} g(\rho,\theta+\Delta\theta)(P(x)f)(\rho,\theta)d\rho d\theta$.

In order to deal with said angular ambiguity, the method of the present invention may consider as side information to determine the origin of the angular coordinate of the local system of intrinsic polar coordinates, one of the following:
  principal curvature direction at said point (only if geometric domain is a surface);
  direction of minimal/maximal absolute change of the data at said point;

According to another aspect of the present invention, if no side information is available, it is known that the angular ambiguity can be removed by first applying the Fourier transform with respect to the angular coordinate and then taking the absolute value, i.e. $|\Sigma_\theta e^{-\omega\theta}(P(x)f)(\rho,\theta)|$. The Fourier transform translates rotational ambiguity into complex phase ambiguity, which is removed by the absolute value.

A further aspect of the method removes angular ambiguity by means of an angular max pooling procedure introduced by the present invention and comprising the steps of:
  creating $N_\theta-1$ additional copies of the template g(ρ,θ) by rotating it along the angular component θ by the angular bin magnitude, obtaining this way a total of $N_\theta$ templates;
  computing the correlation $\int_0^{2\pi}\int_0^{\rho_{max}} g(\rho,\theta+\Delta\theta)(P(x)\theta)(\rho,\theta)d\rho d\theta$ of the patch with all the $N_\theta$ rotated templates;
  taking the maximum operation over all the rotations, which corresponds to selecting the template with the 'maximum response' to the given patch among the $N_\theta$ rotated templates;
which amounts to redefine the convolution operation as $(f*g)(x) = \max_{\Delta\theta \in [0,2\pi)} \int_0^{2\pi}\int_0^{\rho_{max}} g(\rho,\theta+\Delta\theta)(P(x)f)(\rho,\theta) d\rho d\theta$.

Patch Operator Via Anisotropic Heat Kernels

According to another embodiment of the present invention, the patch operator can be defined through anisotropic heat kernels. In this setting, the main idea is to build a local representation P(x)f of the given data f around the point x by averaging a variety of anisotropic heat kernels at different direction. Such kernels capture local directional structures similarly to the local polar system of coordinates previously described. Varying the diffusion time of the heat kernel we can control the spread of the kernel and therefore we can encode information about the scale of the input data f as well.

The construction of such local kernels requires the following steps:

the computations of the thermal conductivity tensor $D_\alpha(x)$ which favors the heat diffusion towards a certain direction. The parameter $\alpha$ controls the degree of anisotropy and is chosen depending on the data or the application considered;

the computation of the rotated heat kernels $D_{\alpha\theta}(x)=R_\theta D_\alpha(x)R_\theta^T$ for various angles $\theta$;

the eigendecomposition of the anisotropic LBO $\overline{\Delta}_X = -\text{div}_X(D_{\alpha\theta}(x)\nabla_X f(x,t))$;

the computation of the anisotropic heat kernels $h_{\alpha\theta t}(x,y) = \tau_{k\geq 1} e^{-t\lambda_{\alpha\theta k}} \phi_{\alpha\theta k}(x)\phi_{\alpha\theta k}(y)$, where $\lambda_{\alpha\theta k}$, $\phi_{\alpha\theta k}$ are the anisotropic eigenvalues and eigenvectors respectively.

The thermal conductivity tensor $D_\alpha(x)$ can be defined either as $$D_\alpha(x) = \begin{pmatrix} \alpha & 0 \\ 0 & 1 \end{pmatrix},$$

where $\alpha$ is a parameter controlling the anisotropy degree or as $$D_\alpha(x) = \begin{pmatrix} \psi_\alpha(k_M(x)) & 0 \\ 0 & \psi_\alpha(k_M(x)) \end{pmatrix}, \text{ where}$$

$$\psi_\alpha(x) = \frac{1}{1+\alpha|x|}$$

and $k_m(x)$, $k_M(x)$ are the minimum and maximum curvature respectively. In the latter situation, $D_\alpha(x)$ drives the diffusion in the direction of the maximum curvature $k_M(x)$.

Once the thermal conductivity tensor $D_\alpha(x)$ is defined, the anisotropic LBO is defined as $\overline{\Delta}_X = -\text{div}_X(D_{\alpha\theta}(x)\nabla_X f(x,t))$, where $D_{\alpha\theta}(x)$ is the rotated version of the operator $D_\alpha(x)$, and the anisotropic heat kernels are defined as $h_{\alpha\theta t}(x,y) = \tau_{k\geq 1} e^{-t\lambda_{\alpha\theta k}} \phi_{\alpha\theta k}(x)\phi_{\alpha\theta k}(y)$, where $\lambda_{\alpha\theta k}$, $\phi_{\alpha\theta k}$ are the anisotropic eigenvalues and eigenvectors respectively. The anisotropic patch operator is defined as $$(P_j(x)f)(t,\theta) = \frac{\int_X w_j(x,y)f(y)dy}{\int_X w_j(x,y)dy}, \quad j=1,\ldots,J,$$

where $w_j(x,y) = h_{\alpha\theta t}(x,y)$ and the diffusion time t plays the role of the scalar component of the local intrinsic polar coordinates. The intrinsic convolution between the input data $f \in L^2(X)$ with a template $g(t,\theta)$ is thus defined as $(f*g)(x) = \int_0^{2\pi}\int_0^{t_{max}} g(t,\theta)(P(x)f)(t,\theta)dtd\theta$.

Figure 13:
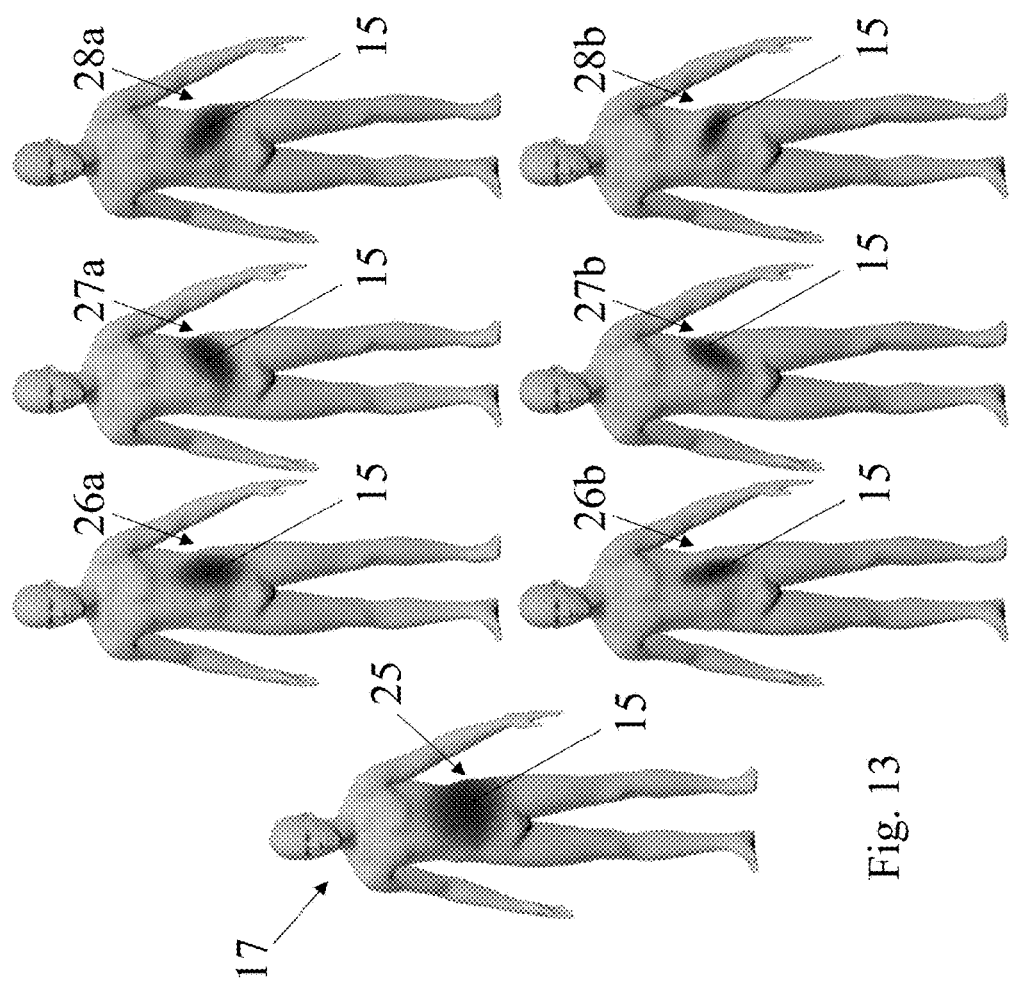
FIG. 13 schematically represents a comparison between isotropic heat kernels and a variety of anisotropic heat kernels for different anisotropy intensities and orientations, where the geometric domain is a mesh, according to the method of the present invention.

FIG. 13 schematically represents a comparison between an isotropic heat kernel 25 around the point 15 and a variety of anisotropic heat kernels 26a-28a, 26b-28b, wherein anisotropic heat kernels 26a, 27a, 28a are characterized by different orientation, while heat kernels 26a, 26b are characterized by different anisotropy intensity, and wherein the geometric domain is a mesh representing a man 17.

Figure 14:
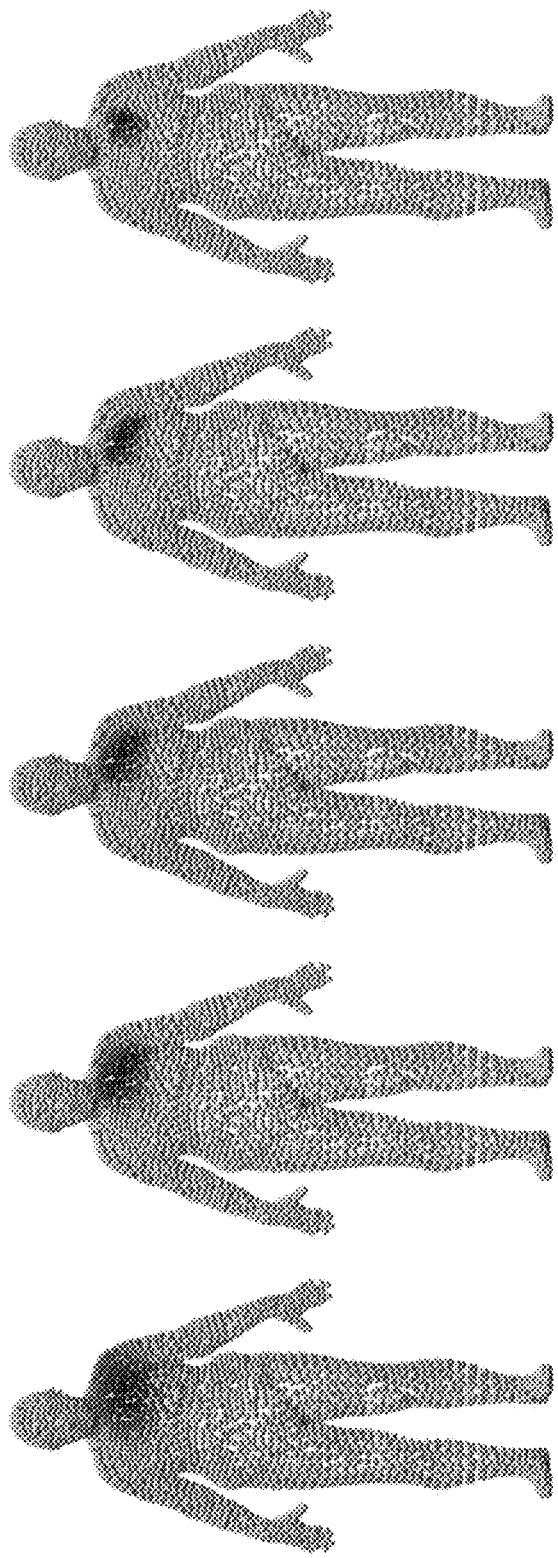
FIG. 14 schematically represents a comparison between isotropic heat kernels and a variety of anisotropic heat kernels for different anisotropy intensities and orientations, where the geometric domain is a point cloud, according to the method of the present invention.

FIG. 14 schematically represents the same comparison of FIG. 13, where the geometric domain is a point cloud.

Figure 15:
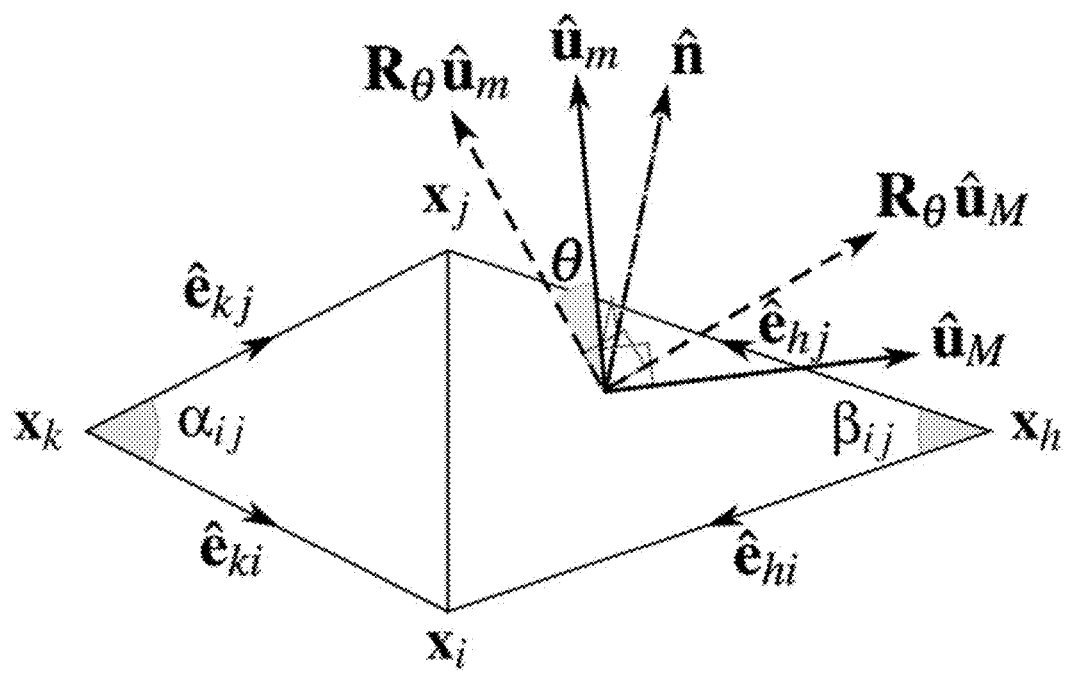
FIG. 15 schematically shows the terms involved in the definition of the anisotropic LBO discretization.

If the geometric domain is approximated with a triangular mesh X, the anisotropic LBO is defined as $\overline{L}=A^{-1}W$, where A is the same as the isotropic case and $$w_{ij} = \begin{cases} \frac{1}{2}\left(\frac{\langle \hat{e}_{kj}, \hat{e}_{ki}\rangle_H}{\sin\alpha_{ij}} + \frac{\langle \hat{e}_{hj}, \hat{e}_{hi}\rangle_H}{\sin\beta_{ij}}\right), & ij=E \\ -\sum_{k\neq i} w_{ik}, & i=j \\ 0, & \text{else} \end{cases}$$

where $\langle \hat{e}_{kj}, \hat{e}_{ki}\rangle_H = \hat{e}_{kj}^T H \hat{e}_{kj}$, $$H = U_{ijk}\begin{pmatrix} D_\alpha & 0 \\ 0 & 1 \end{pmatrix}U_{ijk}^T$$

and $U_{ijk}=(\hat{u}_M, \hat{u}_m, \hat{n})$ is an orthonormal reference frame attached to each triangle $ijk \in F$. The shear matrix H encodes the anisotropic scaling operated by $D_\alpha$ up to an orthogonal basis change. If $D_\alpha = I$, $\langle \hat{e}_{kj}, \hat{e}_{ki}\rangle_H = \cos\alpha_{ij}$ and the isotropic LBO discretization is obtained. FIG. 15 schematically shows a representation of the terms involved in the definition of the anisotropic LBO discretization given above. In order to allow arbitrary direction, the basis vectors $U_{ijk}$ is rotated on each triangle around the respective normal n by the angle $\theta$, equal for all triangles. Denoting by $R_\theta$ the corresponding 3×3 rotation matrix, this is equivalent to modifying the H-weighted inner product with the directed shear matrix $H_\theta = R_\theta H R_\theta^T$. The resulting weights $w_{ij}$ are thus obtained by using the inner products $\langle \hat{e}_{kj}, \hat{e}_{ki}\rangle_H = \hat{e}_{ki}^T H_\theta \hat{e}_{kj}$.

If the geometric domain is approximated with a point cloud instead, the procedure follows the following steps:

for each point x in the point cloud, a local tangent plane is estimated by considering the points within an $\in$-ball $B_\in(x)$ using known techniques;

the points in $B_\in(x)$ are projected onto the tangent plane;

a Delaunay triangulation of the points projected on the tangent plane is constructed.

Once this local mesh triangulation is provided, the previous formulas still hold.

Patch Operators Via Weighting Functions on Local System of Pseudo-Coordinates

According to another aspect of the proposed invention, the patch operator may be defined as a family of weighting functions applied on a local system of pseudo-coordinates around each point on the geometric domain. Therefore, the computation of the patch operator P(x) may further comprises:

the extraction of a local system of pseudo-coordinates around the point $x \in X$;

the computation of weighting functions on such local coordinate system.

In such settings, the resulting intrinsic convolution layer comprises the steps of:

defining a local system of multi-dimensional pseudo-coordinates u around a point $x \in X$;

computing a plurality of weighting functions $w_j$, $j=1,\ldots,J$, acting on said pseudo-coordinates;

applying said weighting functions to define a patch operator;

applying the patch operator to extract a patch of the input data $f$ around a point $x \in X$;

computing the correlation between said patch with a plurality of templates.

Advantageously, such definition of the patch operator is more general than the previous one and comprises, as particular instances, the definition of patch operator via Gaussians on a local system of intrinsic polar coordinates and via anisotropic heat kernels.

Local System of Pseudo-Coordinates

According to an aspect of the present invention, said local system of pseudo-coordinates u can have one or more dimensions and can be defined in different ways, comprising one or more of the following:

geodesic coordinates, at each vertex y∈N(x) (hereinafter N(x) will indicate a neighborhood of x), is associated a 1-dimensional pseudo-coordinate u(x,y) measuring the intrinsic distance between x and y as the geodesic distance between the points, i.e. as the length of the shortest path from x to y along the geometric domain X;

diffusion coordinates, measures the intrinsic distance between x and y, y∈N(x), in terms of a diffusion process, i.e. $u(x,y)=\sqrt{\Sigma_{k\geq 1}e^{-t\lambda_k}(\phi_k(x)-\phi_k(y))^2}$, where $\phi_k$, $\lambda_k$ are the kth eigenfunction and eigenvalue of the LBO respectively;

intrinsic polar coordinates, each vertex y∈N(x) is associated with 2-dimensional polar coordinates u(x,y)=(ρ(x,y), θ(x,y)), where the radial coordinate ρ(x,y) measures the distance between the vertices x, y∈X in terms of one of the intrinsic distances previously introduced. The angular coordinate θ(x,y) can be obtained by ray-shooting from the point x∈X at equispaced angles. If instead, the origin of the angular coordinates of the local system of intrinsic polar coordinates is provided as a side information in terms of a direction v, θ(x,y) measures the angle with respect to such given direction v;

vertex degree, each vertex y∈N(x) is associated with 1-dimensional coordinate u(x,y) measuring either the number of edges incident to y, the number of edges incident to x, or a combination thereof.

Given a point x∈X, the local system of pseudo-coordinates u(x,y) is computed according to one of the previous cases for every neighbor vertex y∈N(x) of x, where the neighborhood size can depend on the application considered. As a particular case, the size of the neighborhood N(x) of x includes the totality of the points on the geometric domain. Said operation of extracting the local system of pseudo-coordinates for the point x is repeated for all the vertices of the geometric domain X.

Figure 16:
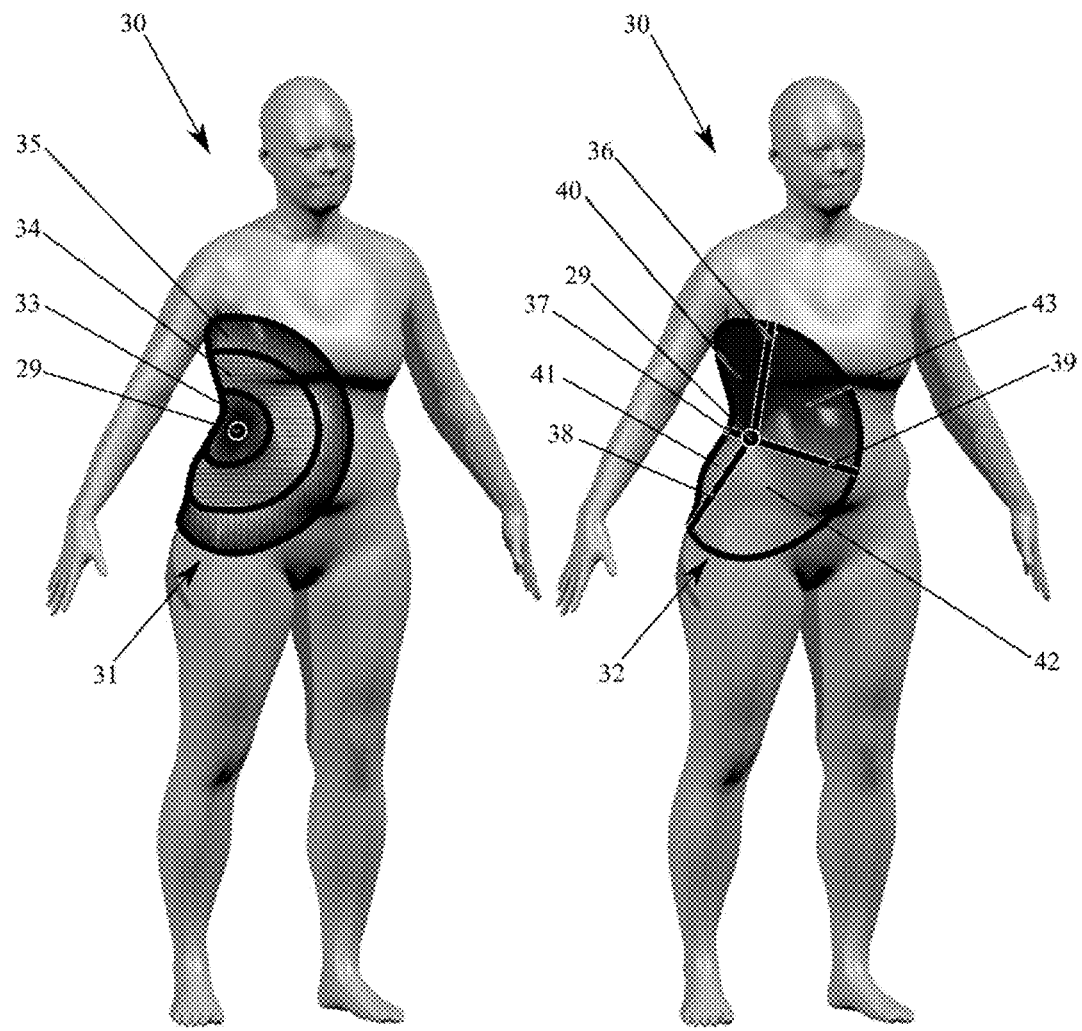
FIG. 16 schematically shows the radial and angular components of the local system of intrinsic polar coordinates, according to the method of the present invention.

FIG. 16 schematically represents the radial (31) and angular (32) components of the local system of intrinsic polar coordinates centered at a point 29 of the geometric domain representing a woman 30. In particular, the radial component 31 measures the intrinsic distance of the points in the neighborhood of the central point 29. With reference to FIG. 16, the region 33 of the radial component 31 contains the closest neighbors, the region 34 contains the neighbors at a medium distance and the region 35 the farthermost points inside said neighborhood. The angular component 32 instead measures the angle between the origin of the angular coordinate 36 and a geodesic emanating form the central point 29 and reaching each neighbor point. Therefore, the angular component of 36, 37, 38, 39 corresponds to 0, 90, 180, 270 degrees respectively. The regions 40, 41, 42, 43 correspond to angular components in the range 0-90, 90-180, 180-270 and 270-360 degrees, respectively.

Weighting Functions

According to another aspect of the proposed invention, for each vertex x∈X several weighting functions $w_j(u)$, j=1, ..., J, can be defined on said pseudo-coordinates u centered in each point x. Among the different weighting functions, we can consider fixed functions comprising but not limiting to:

Gaussian kernels, $$w_j(u) = e^{\left(-\frac{1}{2}(u-\mu_j)^T \Sigma_j^{-1}(u-\mu_j)\right)},$$

where the mean and the covariance matrix of the kernels $$\left(\mu_j, \Sigma_j = \begin{pmatrix} \sigma_{11}^2 & \sigma_{12}^2 \\ \sigma_{21}^2 & \sigma_{22}^2 \end{pmatrix}\right), j = 1, \ldots, J,$$

are fixed;

Anisotropic Gaussian kernels, $$w_j(u) = e^{\left(-\frac{1}{2}u^T R_\vartheta \Sigma_j R_\vartheta^T u\right)},$$

where the covariance matrix of the kernels $$\Sigma_j = \begin{pmatrix} \alpha & \\ & 1 \end{pmatrix}, j = 1, \ldots, J,$$

and the rotation matrix $$R_\vartheta = \begin{pmatrix} \cos\vartheta & -\sin\vartheta \\ \sin\vartheta & \cos\vartheta \end{pmatrix}$$

are fixed;
Anisotropic heat kernels;
Spline kernels;
Orthogonal basis functions;
parametric functions, comprising but not limiting to:
Gaussian kernels, $$w_j^\Theta(u) = e^{\left(-\frac{1}{2}(u-\mu_j)^T \Sigma_j^{-1}(u-\mu_j)\right)}, \text{ where}$$

$$\Theta = \left(\mu_j, \Sigma_j = \begin{pmatrix} \sigma_{11}^2 & \sigma_{12}^2 \\ \sigma_{21}^2 & \sigma_{22}^2 \end{pmatrix}\right), j = 1, \ldots, J,$$

are the parameters of the kernel;
Trigonometric functions, $w_j^\Theta(u) = a\cos(\alpha u) + b\sin(\beta u)$, where $\Theta = \{a, b, \alpha, \beta\}$ are the parameters associated to the weighting function;
or combinations thereof, such as sums of scaled Gaussian kernels or scaled trigonometric functions. In the following description, to uniform the notation, the fixed weighting functions $w_j(u)$ are though as parametric weighting functions $w_j^\Theta(u)$ whose parameter set is empty, i.e. $\Theta=\emptyset$.

Figure 17:
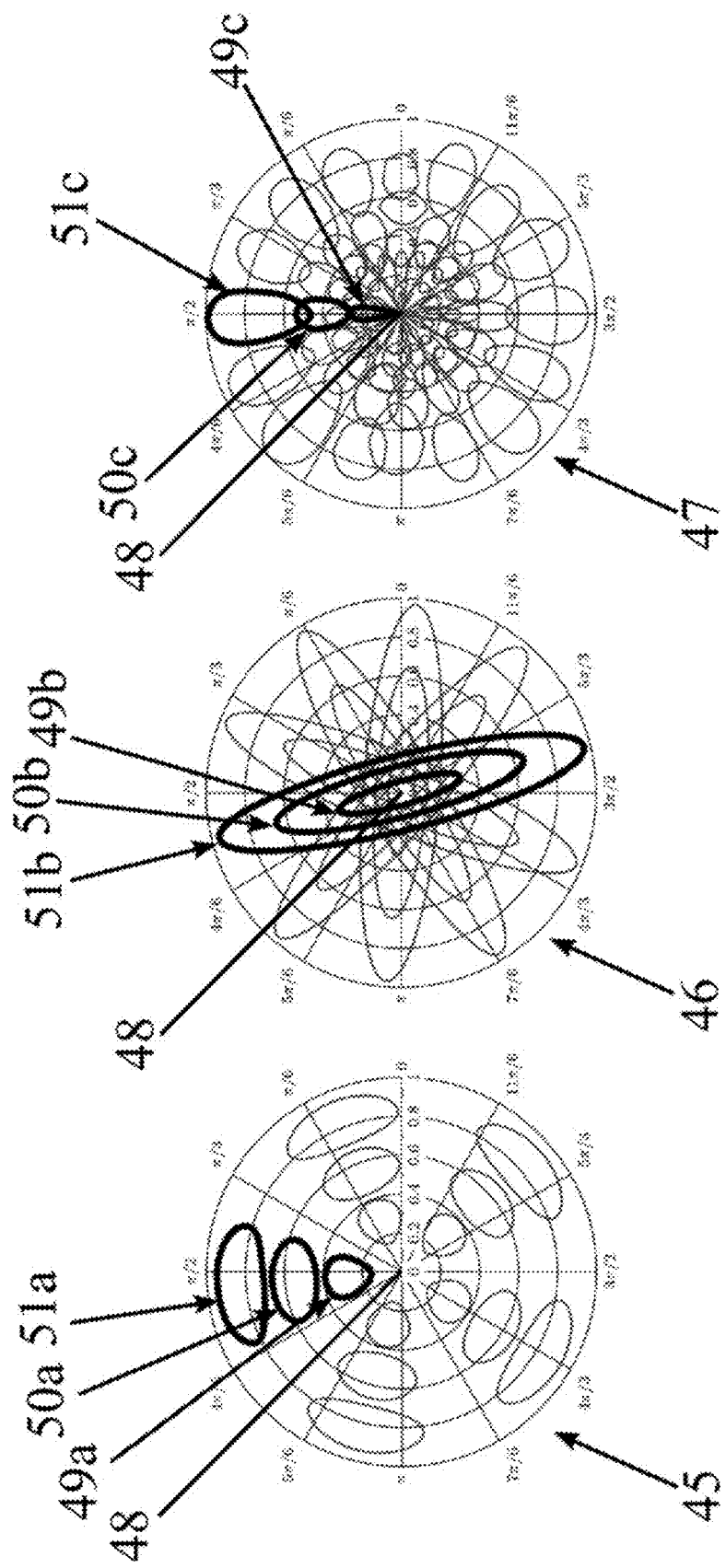
FIG. 17 schematically shows different families of weighting functions generating different patch operators considered as particular instances of the present invention.

FIG. 17 shows the level sets of three different families of weighting functions on a local system of intrinsic polar coordinates represented as a polar plot. More specifically, 45 shows the levels set of fixed Gaussian weighting functions and 49*a*, 50*a*, 51*a* highlight the level sets of weighting functions corresponding to a fixed angular component and small, medium and large radial component, respectively.

The same visualization is repeated in 46 for the case of fixed anisotropic Gaussian weighting functions and in 47 for the case of parametric Gaussian weighting functions.

Patch Operators Via Weighting Functions on Local System of Pseudo-Coordinates

According to another embodiment of the present invention, the patch operator P(x) can be defined by applying said weighting functions $w\Theta=(w_1^\Theta(u(x,y)), \ldots, w_J^\Theta(u(x,y)))$ associated with a point $x \in X$ to the input signal $f$, i.e. $P_j(x)f=\int_X w_j^\Theta(u(x,y)) f(y) dy, j=1,\ldots,J$. The patch operator P(x) is computed for all the points $x \in X$ of the geometric domain X.

Depending on which pseudo-coordinates u and weighting functions $w^\Theta$ are considered, different patch operators can be defined. In particular, in the following description, four different patch operators are introduced as particular instances of the proposed method by considering:

Fixed Gaussians on intrinsic polar coordinates;
Fixed Anisotropic Gaussians on intrinsic polar coordinates;
Parametric Gaussians on intrinsic polar coordinates;
Parametric Gaussians on vertex degrees;

Such framework that allows to define patch operators via weighting functions on local system of pseudo-coordinates is more general than the previous definitions of patch operators and include, as particular cases, both the patch operator via Gaussians on intrinsic polar coordinates and the patch operator via anisotropic heat kernels, previously introduced.

Patch Operator Via Fixed Gaussian Weighting Functions

In particular, the patch operator via Gaussians on intrinsic polar coordinates can be defined by considering as pseudo-coordinates said intrinsic polar coordinates and as weighting functions said fixed Gaussians.

More in details, given a point $x \in X$, such patch operator can be defined by the following three steps:

construction of the local system of intrinsic polar coordinates $u(x,y)=(\rho(x,y),\vartheta(x,y))$ on the geometric domain X, i.e. a bijection $u(x,y):N(x) \to [0,\rho_{max}] \times [0,2\pi)$ that maps a local neighborhood N(x) of x to a system of intrinsic polar coordinates $(\rho,\vartheta)$;

construction of fixed Gaussian weighting functions $$w_j(\rho, \vartheta) = e^{\left(-\frac{1}{2}(u-\mu_j)^T \begin{pmatrix} \sigma_\rho^2 & \\ & \sigma_\vartheta^2 \end{pmatrix}^{-1} (u-\mu_j)\right)},$$

where $\sigma_\rho, \sigma_\vartheta$ a are the mean of the Gaussian along the radial and angular directions respectively. This step is agnostic on the data $f$;

construction of the patch operator, i.e. $(P_j(x)f)(\rho,\theta)=\int_X w_j^\Theta(\rho, \vartheta)f(y) dy, j=1,\ldots,J$, by applying said weights $w_j(\rho, \vartheta)$ to said input data $f$.

Patch Operator Via Fixed Anisotropic Gaussian Weighting Functions

The patch operator via anisotropic heat kernels can be defined by considering as pseudo-coordinates said intrinsic polar coordinates and as weighting functions fixed anisotropic Gaussians, i.e.

$$w_j(u) = e^{(-\frac{1}{2}u^T R_\vartheta \Sigma_j R_\vartheta^T u)},$$

where $u(x,y)=(\rho(x,y),\vartheta(x,y))$ and the covariance matrix of the kernels $$\sum\nolimits_j = \begin{pmatrix} \alpha & \\ & 1 \end{pmatrix}, j=1,\ldots,J,$$

and the rotation matrix $$R_\vartheta = \begin{pmatrix} \cos\vartheta & -\sin\vartheta \\ \sin\vartheta & \cos\vartheta \end{pmatrix}$$

are fixed.

Patch Operator Via Parametric Gaussian Weighting Functions on Surfaces

According to another embodiment of the present invention, the patch operator can be defined by keeping the same local system of intrinsic polar coordinates but choosing parametric weighting functions, such as parametric Gaussians, rather than fixed weighting functions. The main idea behind the use of parametric weighting functions instead of fixed ones, is to add more flexibility to the framework by choosing different parameters able to adapt the weighting functions to each vertex rather than using the same fixed parameters over the whole geometric domain. The parameters of the parametric Gaussians are part of the parameters of the intrinsic convolution layer and are optimized during the training procedure.

More in details, the parametric Gaussian weighting functions are defined as $$w_j^\Theta(u) = e^{\left(-\frac{1}{2}(u-\mu_j)^T \Sigma_j^{-1}(u-\mu_j)\right)}, \text{ where}$$

$$\Theta = \left(\mu_j, \Sigma_j = \begin{pmatrix} \sigma_{11}^2 & \sigma_{12}^2 \\ \sigma_{21}^2 & \sigma_{22}^2 \end{pmatrix}\right), j=1,\ldots,J,$$

are the learnable parameters of the kernel. Similarly to the previous instances of the current invention, the patch operator is defined as $P_j(x)f=\int_X w_j^\Theta)(u(x,y)) f(y) dy, j=1,\ldots,J$, and the intrinsic convolution operation between the input data $f$ and the template g is defined as $(f*g)(x)=\Sigma_{j=1}^J g_j(P_j(x)f)$. More complex parametric weighting functions may be chosen, including non-linear transformation of pseudo-coordinates u before passing them to the parametric Gaussian kernels.

Patch Operator Via Parametric Gaussian Weighting Functions on Undirected Graphs

Another aspect of the method of the present invention allows to define the patch operator, and consequently the intrinsic convolution operation, on graphs.

In this setting, the local system of pseudo-coordinates u can be defined in terms of the vertex degrees and the weighting functions can be defined as a family of parametric Gaussians thereon. The parameters of the parametric Gaussians are part of the parameters of the intrinsic convolution layer and are optimized during the training procedure.

More in details, given the undirected graph (V,E), where $V=\{1,\ldots,N\}$ is the set of N vertices and $E \subseteq V \times V$ is the set of edges (since the graph is undirected, edges does not have a preferred direction, i.e. if $(i,j) \in E$, then $(j,i) \in E$).

In this setting, the local system of pseudo-coordinates for the node $x \in V$ is defined as $$u(x, y) = A\left(\frac{1}{\sqrt{\deg(x)}}, \frac{1}{\sqrt{\deg(y)}}\right) + b,$$

where $\deg(x)$ denotes the degree of the vertex $x \in V$ (the number of edges incident to it), A is a matrix of parameters of size d×2, b is a vector of parameters of size d×1. The parameter d is chosen according to the application or the input data dimension (usually d=2, 3). The matrix elements $a_{ij}$, i=1, . . . , d, j=1, 2, and the vector elements $b_i$, i= 1, . . . , d, are additional parameters of the intrinsic convolutional layer and are optimized during the learning procedure.

On such local pseudo-coordinates, the weighting functions are defined as the parametric Gaussians $$w_j^\Theta(u(x, y)) = e^{\left(\frac{1}{2}(u(x,y)-\mu_j)^T \Sigma_j^{-1}(u(x,y)-\mu_j)\right)},$$

where $(\Sigma_j, \mu_j)$, j=1, . . . , J are the covariance matrices and mean vector representing the parameters of the Gaussian kernels. Analogously to the previous instances of the proposed method, the patch operator is defined as $P_j(x)f = \int_X w_j^\Theta (u(x,y)) f(y) \, dy$, j=1, . . . , J, and the intrinsic convolution operation between the input data $f$ and the template g is defined as $(f*g)(x) = \sum_{j=1}^{J} g_j(P_j(x) f)$.

Patch Operator Via Parametric Weighting Functions on Raster Scans

As a particular case, a geometric domain X can be provided in terms of a raster scan, i.e. a parametric surface $f(x_1, x_2): \Omega \subset \mathbb{R}^2 \to \mathbb{R}$, describing the depth of the geometric domain X at the point $(x_1, x_2) \in \Omega$. In such case, the geometric domain can be discretized as a regular grid on the parameterization domain whose vertices are associated with the depth value of the corresponding points on said geometric domain. In such settings, the intrinsic convolution layer can be applied in a sliding window fashion, in the same way known convolution layer are applied on images.

Figure 18:
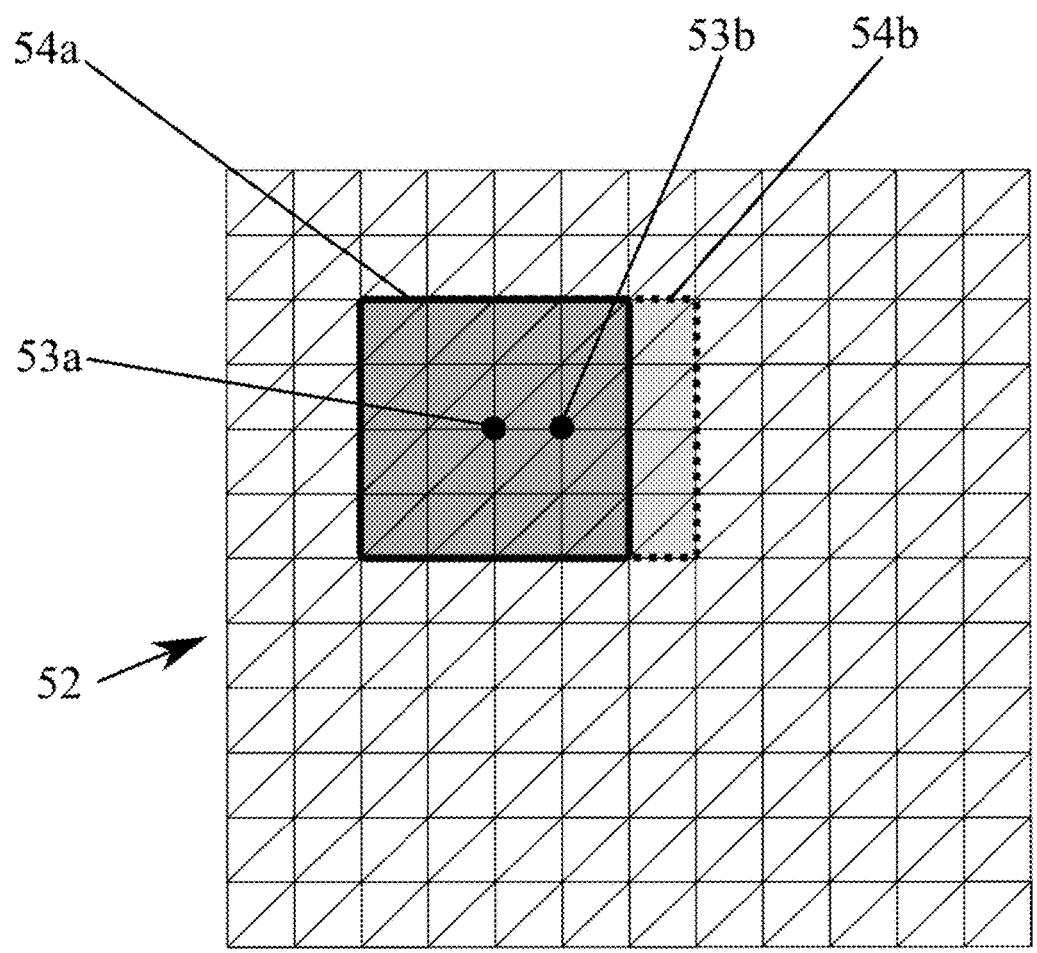
FIG. 18 schematically shows the sliding window definition on the discretization of a raster scan with a regular grid.

More specifically, with reference to FIG. 18, the sliding window operation on the raster scan 52 comprises the steps of:
determining the central point 53a of the window 54a;
extracting a block of points (dark gray region) around said central point 53a of the window 54a;
defining said multi-dimensional pseudo-coordinates for each point of said block of points;
computing said plurality of weighting functions acting on said multi-dimensional pseudo-coordinates;
applying said weighting functions to define said patch operator extracting a local representation of the input data at the points of said block of points;
computing the correlation of said patch resulting from the extraction with a plurality of templates;
and moving the window 54a to the next adjacent location 53b obtaining in this way the window 54b (light gray region). The previous steps are repeated on the window 54b.

Patch Operator Via Parametric Weighting Functions on Graph Motifs

According to another embodiment of the present invention, said intrinsic convolution layer can be defined on directed graphs as well, by first transforming them in a family of weighted undirected graphs whose weights depends on a given set of graph motifs.

Figure 19:
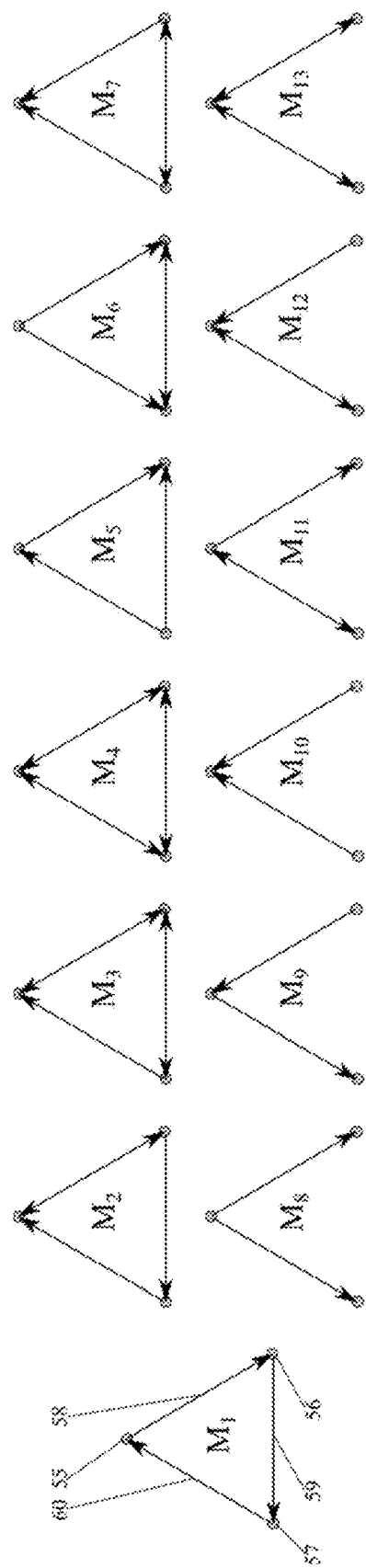
FIG. 19 shows various examples of graph motifs for a basic graph consisting of 3 vertices only.

A graph motif is a sub-graph which plays the role of a building block for describing more complex graphs or networks. FIG. 19 schematically shows how graph motifs $M_i$, i=1, . . . , 13, can be defined in the simple case of a directed graph with three vertices (55, 56, 57) and three edges (58, 59, 60). Different graph motifs capture different structures and connections that may appear for instance in a social network tracking the behavior of a group of people.

Given a directed graph G and a graph motif $M_i$, a weighted undirected graph $\tilde{G}_i$ is defined by considering as vertices the same vertices of G and by defining the edge weights as the occurrence of the graph motif $M_i$. Once the weighted undirected graph $\tilde{G}_i$ is extracted from G, the patch operator on $\tilde{G}_i$ is extracted by defining a local system of pseudo-coordinates and a family of weighting functions thereon. As a particular example, the patch operator can be defined following the same construction of the patch operator via parametric Gaussian weighting functions on undirected graphs, i.e. by considering as pseudo-coordinates non-linear functions of the vertex degree and as weighting function a family of parametric Gaussians thereon. Other examples of pseudo-coordinates include but are not limited to geodesic or diffusion distance from a vertex.

Other Layers

Following the same construction of known convolutional neural networks, the proposed method combines other known layers with the intrinsic convolution layer either to achieve better performance or to adapt the presented method to the desired application.

In particular, the proposed method consists of several layers than can be applied subsequently, by this meaning that the output of the previous layer is used as input into the subsequent one to form a hierarchy of transformations. Other known layers include:

linear layer or fully connected layer, given an I-dimensional input $f^{in} = (f_1^{in}(x), \ldots, f_I^{in}(x))$ produces a Q-dimensional output $f^{out} = (f_1^{out}(x), \ldots, f_Q^{out}(x))$ as linear combination of the input channels with a set of learnable parameters w, $f_q^{out}(x) = \sum_{i=1}^{I} w_{qi} f_p^{in}$, q= 1, . . . , Q;

non-linear layer, optionally it follows a linear layer by applying a non-linear function to the output of the linear layer, i.e. $f_q^{out}(x) = \xi(f_i^{in})$, i=1, . . . , Q. The non-linear functions $\xi$ are often referred to as activation functions. Most common activation functions include, but are not limited to:

ReLU, $\xi(f_i^{in}) = \max\{0, f_i^{in}\}$;
logististic, $$\xi(f_i^{in}) = \frac{1}{1 + e^{-f_i^{in}}};$$

hyperpolic tangent, $\xi(f_i^{in}) = \tan h(f_i^{in})$;
softmax, $$\xi(f_i^{in}) = \frac{e^{f_i^{in}}}{\sum_{p=1}^{P} e^{f_i^{in}}};$$

spatial pooling layer, consists in a spatial aggregation of input data to enforce a hierarchy structure in the learned features. More specifically, the spatial pooling layer comprises the steps of:

determining a subset of points $x_1, \ldots, x_N$ on the geometric domain X;

for each point $x_i$ of the subset, determining the neighbors $x_i^1, \ldots, x_i^M$, on the geometric domain;

computing an averaging operation on input data over the neighbors for all the points on said subset.

Averaging operations include the known
arithmetic mean, $$f(x_i) = \frac{1}{M}\sum_{j=1}^{M} f(x_i^j);$$

a maximum operation, $f(x_i)=\max_{j=1,\ldots,M} f(x_i^j)$;
and the novel weighted average with weights depending on an intrinsic distance between points, $f(x_i)=\sum_{j=1}^{M} d_X(x_i, x_i^j) f(x_i, x_i^j)$, where $d_X(\cdot,\cdot)$ is one of the intrinsic distances previously mentioned;

weighted average with weights depending on local volume elements $f(x_i)=\sum_{j=1}^{M} \text{vol}_X(x_i^j) f(x_i^j)$, where $\text{vol}_X(x_i^j)$ can be the area of a local patch around the point $x_i^j$;

covariance layer, it is used in applications such as retrieval where one needs to aggregate the point-wise descriptors to produce a global shape descriptor $f_{out}(x)=\int_X (f^{in}(x)-\mu)(f^{in}(x)-\mu)^T dx$, where $f^{in}(x)=(f_1^{in}(x), \ldots, f_I^{in}(x))$ is a P-dimensional input vector, $\mu=\int_X f^{in}(x) dx$, and $f^{out}(x)$ is a I×I matrix column-stacked into a $I^2$-dimensional vector. Typically, it is considered just before the output layer.

Each of the previous layers has input data and output data and the output data of one layer in the sequence can be given as input to any subsequent layer, or layers, in the sequence. The present invention does not impose any constraint on the composition of said layers, including any limit on the order or the number of layers to consider.

Such sequence of customized layers can be thought of as a non-linear hierarchical parametric function $\psi_\Theta(F)$, where $F=(f(x_1), \ldots, f(x_N))$ is a I×N matrix of input features at all the points of the geometric domain, and $\Theta$ denotes the parameters of all the layers, and $\psi_\Theta(F)=\psi_N \circ \psi_{N-1} \circ \ldots \circ \psi_0(F)$, where $\psi_i$ indicates one of the aforementioned layers.

Cost Functions

Advantageously, depending on the application in mind, the present invention allows to learn these parameters by minimizing some task specific cost function. The present invention allows to learn the parameters $\Theta$, i.e. intrinsic convolution templates, B-spline interpolation weights, linear combination weights, etc.

The applications that the proposed invention can deal with, include:

invariant descriptors, i.e. finding descriptors that are the most similar as possible for corresponding points, or positives, and the most dissimilar as possible at non-corresponding points, or negatives;

correspondences, i.e. labelling each vertex of a query geometric domain X with the index of a corresponding point on some reference geometric domain Y.

shape retrieval, i.e. producing a global shape descriptor that discriminates between shape classes.

For this purpose, the present invention consider a siamese network configuration, composed of two identical copies of the same intrinsic convolutional neural network model sharing the same parameterization and fed by pairs of knowingly similar or dissimilar samples, and minimize a cost function such as, $l(\Theta)=(1-\gamma)\sum_{i=1}^{|T_+|}\|\psi_\Theta(f_i)-\psi_\Theta(f_i^+)\|^2+\gamma\sum_{i=1}^{|T_-|}(\mu-\|\psi_\Theta(f_i)-\psi_\Theta(f_i^-)\|)_+^2$, where $\gamma\in[0,1]$ is a parameter trading off between the positive and the negative losses, $\mu$ is a margin, $(x)_+=\max\{0,x\}$ and $T_\pm=\{(f_i, f_i^+)\}$ denotes the sets of positive and negative pairs, respectively. Variants of such cost function can be used as well.

Other examples of cost functions do not rely on the siamese network construction, therefore they can be minimized by only one intrinsic convolutional neural network. Example of such cost functions are:

multinomial regression loss, $l(\Theta)=-\sum_{i=1}^{|T|} e_{j_i} \log \psi_\Theta(f_i)$, where $e_i$ is a unit vector with one at index i, and $T=\{f(x_i), j_i\}$ represents a set of known correspondences.

regression loss, $l(\Theta)=-\sum_{i=1}^{|T|} \|\psi_\Theta(f_i)-j_i\|_p$ where $j_i$ represents the desired output of the model (teacher signal) and $\|\cdot\|_p$ denotes the p-norm (usually p=2). As means of example $j_i$ can be the spectral coefficients of some target functions.

In some embodiments, the methods and processes described herein can be embodied as code and/or data. The software code and data described herein can be stored on one or more machine-readable media (e.g., computer-readable media), which may include any device or medium that can store code and/or data for use by a computer system. When a computer system reads and executes the code and/or data stored on a computer-readable medium, the computer system performs the methods and processes embodied as data structures and code stored within the computer-readable storage medium.

It should be appreciated by those skilled in the art that machine-readable media (e.g., computer-readable media) include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium that can be used with embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

In some embodiments, one or more (or all) of the steps performed in any of the methods of the subject invention can be performed by one or more processors (e.g., one or more computer processors). For example, any or all of the means for applying an intrinsic convolution layer, the means for applying one or more layers as described herein, the means for determining similarity between two geometric objects, and the means for determining correspondence between objects from a class of geometric objects and a reference object can include or be a processor (e.g., a computer processor) or other computing device.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A computer-system-implemented method for extracting hierarchical features from data defined on a geometric domain, comprising applying on said data at least an intrinsic convolution layer, the data being stored on a memory of a computer system, the method including the steps of:
    applying, by a processor of the computer system, a patch operator to extract a local representation of the input data around a point on the geometric domain and outputting a correlation of said local representation resulting from the extraction with a plurality of templates;
    defining, by the processor, a local system of multi-dimensional pseudo-coordinates around a point on the geometric domain:
    computing, by the processor, a plurality of weighting functions acting on said pseudo coordinates;
    storing said weighting functions on the memory of the computer system; and
    applying, by the processor, said weighting functions to define said patch operator, thereby improving the ability of the computer system to apply a deep learning method to said data.

2. The method according to claim 1, wherein the geometric domain is one of the following:
    a manifold;
    a parametric surface;
    an implicit surface;
    a mesh;
    a point cloud;
    an undirected weighted or unweighted graph;
    a directed weighted or unweighted graph.

3. The method according to claim 1, wherein the multi-dimensional pseudo-coordinates have one or more dimensions and comprise one or more of the following:
    geodesic coordinates;
    diffusion coordinates;
    intrinsic polar coordinates;
    vertex degree.

4. The method according to claim 1, wherein said weighting functions are fixed functions.

5. The method according to claim 1, wherein said weighting functions are parametric functions.

6. The method according to claim 5, wherein said weighting functions are sums of scaled trigonometric functions, and said parameters comprise the scale factors of the trigonometric functions.

7. The method according to claim 5, wherein said weighting functions are sums of scaled Gaussian kernels, and where said parameters comprise:
    the scale factors of the Gaussian kernels;
    the mean vectors of the Gaussian kernels, or a subset of elements thereof;
    the covariance matrices of the Gaussian kernels, or a subset of elements thereof.

8. The method according to claim 7, wherein the covariance matrices of the Gaussian kernels are diagonal, and the subset of their elements comprises the diagonal elements.

9. The method according to claim 1, wherein said weighting functions are one of the following:
    Gaussian kernels;
    spline kernels;
    trigonometric functions;
    orthogonal basis functions.

10. The method according to claim 1, wherein the points of the geometric domain are in a grid, and wherein said step of applying the intrinsic convolutional layer on input data comprises applying a sliding window operation.

11. The method according to claim 10, wherein the sliding window operation further comprises:
    determining the center point of the window;
    extracting a block of points around said center point of the window;
    defining said multi-dimensional pseudo-coordinates for each point of said block of points;
    computing said plurality of weighting functions acting on said multi-dimensional pseudo-coordinates;
    applying said weighting functions to define said patch operator extracting a local representation of the input data at the points of said block of points;
    computing the correlation of said patch resulting from the extraction with a plurality of templates; and
    moving the window to a next adjacent location.

12. The method according to claim 1, wherein the geometric domain is a directed graph, and further comprising the steps of:
    inputting a plurality of graph motifs; for each input graph motif
    computing a new undirected weighted graph wherein the vertices are those of the input graph, and each edge is weighted by the occurrence of the graph motif;
    computing said multi-dimensional pseudo-coordinates around each vertex of said undirected weighted graph;
    computing said plurality of weighting functions acting on said pseudo -coordinates;
    applying the weighting functions to define said patch operator extracting said local representation of the input data around said point on the geometric domain; and
    outputting the correlation of said patch resulting from the extraction with said plurality of templates.

13. The method according to claim 12, wherein the multi-dimensional pseudo-coordinates computed for each undirected weighted graph comprise at least one of the following:
    vertex degree;
    geodesic distance from a vertex;
    diffusion distance from a vertex.

14. The method according to claim 12, wherein the weighting functions are diffusion kernels computed on the weighted undirected graphs for all the input graph motifs.

15. The method according to claim 14, wherein the diffusion kernels comprise heat kernels with a plurality of time scales.

16. The method according to claim 15, wherein the diffusion kernels are anisotropic diffusion kernels.

17. The computer implemented method according to claim 1 for extracting hierarchical features from data defined on a geometric domain, wherein said data are defined and stored in a storage of a computer, said computer including means for applying on said data at least an intrinsic convolution layer, said means executing the steps of:
applying a patch operator to extract a local representation of the input data around a point on the geometric domain and outputting the correlation of a patch resulting from the extraction with a plurality of templates.

18. A computer-system-implemented method for extracting hierarchical features from data defined on a geometric domain, comprising applying on said data at least an intrinsic convolution layer, the data being stored on a memory of a computer system, the method including the steps of:
applying, by a processor of the computer system, a patch operator to extract a local representation of the input data around a point on the geometric domain and outputting a correlation of said local representation resulting from the extraction with a plurality of templates; and
further applying at least one of the following layers:
a linear layer, including outputting a weighted linear combination of input data;
a non-linear layer, including applying a non-linear function to input data;
a spatial pooling layer, including:
determining a subset of points on the geometric domain;
for each point of said subset, determining the neighbours on the geometric domain; and
computing an aggregation operation on input data over the neighbours for all the points of said subset;
a covariance layer, including computing a covariance matrix of input data over all the points of the geometric;
a fully connected layer, including outputting a weighted linear combination of input data at all the points of the geometric domain,
wherein each layer has input data and output data stored on the memory of the computer system, and output data of one layer are given as input data to another layer, thereby improving the ability of the computer system to apply a deep learning method to said data.

19. The method according to claim 18, wherein said spatial pooling layer comprises aggregating of input data over the whole domain.

20. The method according to claim 18, wherein said aggregation operation of input data comprises one of the following:
maximum computation;
average computation;
weighted average computation;
average of squares computation.

21. The method according to claim 18, wherein two or more of said layers are applied in sequence, and the output data of one layer in the sequence is given as input data to a subsequent layer in the sequence.

22. The method according to claim 18, wherein more than one of said layers is applied and wherein parameters of the applied layers comprise one or more of the following:
weights of the linear layers;
templates of the intrinsic convolutional layers;
parameters of the weighting functions used to compute the patch operators in the intrinsic convolutional layer.

23. The method according to claim 22, wherein parameters of the applied layers are determined by minimizing a cost function by means of an optimization procedure.

24. The method according to claim 23, wherein a plurality of said cost functions are defined and wherein each of said cost functions is associated to one or more application for which feature extraction is carried out.

25. The method according to claim 23, wherein the input into the optimization procedure is a training set comprising:
a positive set of pairs of points on one or more geometric domains
a negative set of pairs of points on one or more geometric domains;
and wherein two identical copies of the hierarchical system configured with the same parameters are fed with pairs of points from said positive and negative sets, and wherein the optimization procedure tries to minimize the distance between the outputs corresponding to positive pairs and maximize the distance between the outputs corresponding to negative pairs.

26. A computer-system-implemented. method for extracting hierarchical features from data defined on a geometric domain, comprising applying on said data at least an intrinsic convolution layer, the data being stored on a memory of a computer system, the method including the steps of:
applying, by a processor of the computer system, a patch operator to extract a local representation of the input data around a point on the geometric domain and outputting a correlation of said local representation resulting from the extraction with a plurality of templates;
wherein the patch operator inputs data on geometric domain and said point on said domain, and outputs the local representation of said data around said point, thereby improving the ability of the computer system to apply a deep learning method to said data,
wherein the local representation is one or more of the following:
data represented in a local intrinsic polar system of coordinates;
data transformed by a windowed Fourier transform;
data weighted by anisotropic diffusion kernels.

27. The method according to claim 26, wherein the patch operator outputs said local representation of input data in the local intrinsic polar system of coordinates, and wherein an origin of angular coordinates of the local intrinsic polar system of coordinates is provided as side information extracted from the geometric domain or the data.

28. The method according to claim 27, wherein the geometric domain is a surface and the side information used to determine the origin of the angular coordinate of the local intrinsic polar system of coordinates at each point on the surface is a principle curvature direction at said point.

29. The method according to claim 27, wherein the side information used to determine the origin of the angular coordinate of the local intrinsic polar system of coordinates at each point is a direction of a minimal or maximal absolute change of the data at said point.

30. The method according to claim 26, wherein the patch operator outputs said local representation of input data in the local intrinsic polar system of coordinates, and the Fourier transform is applied with respect to angular coordinates, followed by an absolute value operation.

31. The method according to claim 26, wherein the computation of said correlation between said patch and said plurality of templates further comprises the steps of:
rotating each template along angular coordinates;
computing the correlation of the patch with the rotated template;
taking a maximum operation over all the rotations.

32. The method according to claim 26, wherein the representation of input data in the local polar system of coordinates around the point on the geometric domain further comprises the steps of:
  computing an intrinsic distance from said point to all the other points on the geometric domain;
  computing level sets of said intrinsic distance at a plurality of levels;
  splitting a full angle at said point into a plurality of angular directions;
  shooting rays emanating from said point along said directions perpendicular to said level sets.

33. The method according to claim 32, wherein said intrinsic distance is one of the following or an approximation thereof:
  geodesic distance;
  diffusion distance;
  commute time distance;
  biharmonic distance.

34. The method according to claim 32, wherein the representation of input data further comprises the steps of:
  computing weights localized around level sets and rays;
  computing weighted averages of input data with each of said weights.

35. The method according to claim 26, wherein computing the windowed Fourier transform of input data further comprises:
  computing localized modulated atoms;
  computing inner products of data with said atoms.

36. The method according to claim 35, wherein localized modulated atoms are heat kernels multiplied by Laplacian eigenfunctions.

37. The method according to claim 36, wherein the heat kernels are anisotropic.

38. The method according to claim 26, wherein the computation of local representation of input data around a point on geometric domain further comprises the steps of:
  computing a plurality of directed anisotropic heat kernels at said point, corresponding to a plurality of anisotropy constants and directions;
  computing weighted averages of input data with said directed anisotropic heat kernels.

39. A computer-system-implemented method for extracting hierarchical features from data defined on a geometric domain. comprising applying on said data at least an intrinsic convolution layer, the data being stored on a memory of a computer system, the method including the steps of:
  applying, by a processor of the computer system, a patch operator to extract a local representation of the input data around a point on the geometric domain and outputting a correlation of said local representation resulting from the extraction with a plurality of templates;
  including extracting hierarchical features from data defined on another geometric domain, applying on data defined on said another geometric domain at least the intrinsic convolution layer, including the steps of:
    applying a patch operator to extract a local representation of further input data around a point on the another geometric domain and outputting the correlation of a patch resulting from the extraction of the local representation of the further input data with said plurality of templates, thereby improving the ability of the computer system to apply a deep learning method to said data,
  wherein data defined on the geometric domain are associated to a first geometric object and said data are defined on the additional geometric domain are associated to a second geometric object, and
  wherein a similarity of the first object to the second object is measured based on the hierarchical features extracted from data defined on the geometric object and the hierarchical features extracted from data defined on said another geometric object.

40. The method according to claim 39, wherein said similarity measure is used for a shape retrieval application of the first object,
  wherein data defined on a plurality of geometric domains are provided as a collection of second objects,
  a similarity between each second object of the collection and the first object is measured,
  an object of the collection having the highest measure of similarity is returned as an object retrieved in the first object.

41. The method according to claim 39, wherein the geometric domain is a graph modelling a social network wherein the first object and second object are nodes of the graph corresponding to members of the social network, and wherein said similarity measure is a measure of similarity between said members of the social network, and wherein the measure of similarity is used to estimate a behaviour of one of the member in the social network based on a known behaviour of the other member of the social network with which the similarity has been measured, wherein said estimated behaviour is considered to be the known behaviour for a value of said measured similarity which is above a predetermined threshold.

42. A computer-system-implemented method for extracting hierarchical features from data defined on a geometric domain comprising applying on said data at least an intrinsic convolution layer, the data being stored on a memory of a computer system, the method including the steps of:
  applying, by a processor of the computer system, a patch operator to extract a local representation of the input data around a point on the geometric domain and outputting a correlation of said local representation resulting from the extraction with a plurality of templates, thereby improving the ability of the computer system to apply a deep learning method to said data:
  wherein said extracted hierarchical features are used for determining correspondences between objects from a class of geometric objects, provided as a plurality of data defined on a corresponding plurality of geometric domains, and an first object associated to said data defined on the geometric domain.

43. The method according to claim 42, wherein said correspondences between said class of geometric objects and said first object are used to automatically transfer a texture of said first object to said class of objects.

44. The method according to claim 42, wherein said correspondences between said class of geometric objects and said first object are used to automatically transfer an animation of said reference object to said class of objects.

45. A computer system for extracting hierarchical features from data defined on a geometric domain, comprising a memory and a processor for applying on said data at least an intrinsic convolution layer, where said computer system is configured to:
  apply, by the processor, a patch operator for extracting a local representation of the input data around a point on the geometric domain and to return as output a correlation of said local representation resulting from the extraction with a plurality of templates;
  define, by the processor, a local system of multi-dimensional pseudo-coordinates around a point on the geometric domain;

compute, by the processor, a plurality of weighting functions acting on said pseudo -coordinates;
store said weighting functions on the memory; and
apply, by the processor, said weighting functions to define the patch operator, thereby improving the ability of the computer system to apply a deep learning method to said data.

46. The system according to claim 45, wherein the geometric domain is one of the following:
a manifold;
a parametric surface;
an implicit surface;
a mesh;
a point cloud;
an undirected weighted or unweighted graph;
a directed weighted or unweighted graph.

47. The system according to claim 45, wherein the multi-dimensional pseudo-coordinates have one or more dimensions and comprise one or more of the following:
geodesic coordinates;
diffusion coordinates;
intrinsic polar coordinates;
vertex degree.

48. The system according to claim 45, wherein said weighting functions are fixed functions.

49. The system according to claim 45, wherein said weighting functions are parametric functions.

50. The system according to claim 49, wherein said weighting functions are sums of scaled trigonometric functions, and said parameters comprise the scale factors of the trigonometric functions.

51. The system according to claim 49, wherein said weighting functions are sums of scaled Gaussian kernels, and wherein said parameters comprise:
the scale factors of the Gaussian kernels;
the mean vectors of the Gaussian kernels, or a subset of elements thereof;
the covariance matrices of the Gaussian kernels, or a subset of elements thereof.

52. The system according to claim 51, wherein the covariance matrices of the Gaussian kernels are diagonal, and the subset of their elements comprises the diagonal elements.

53. The system according to claim 45, wherein said weighting functions are one of the following:
Gaussian kernels;
spline kernels;
trigonometric functions;
orthogonal basis functions.

54. The system according to claim 45, wherein the points of the geometric domain are in a grid, and wherein said means for applying the intrinsic convolutional layer on input data are configured to apply a sliding window operation.

55. The system according to claim 54, wherein said means for applying the intrinsic convolutional layer are further configured to:
determining the center point of the window;
extracting a block of points around said center point of the window;
defining said multi-dimensional pseudo-coordinates for each point of said block of points;
said plurality of weighting functions acting on said multi-dimensional pseudo -coordinates;
said weighting functions to define said patch operator extracting a local representation of the input data at the points of said block of points;
computing the correlation of said patch resulting from the extraction with a plurality of templates; and
moving the window to a next adjacent location.

56. The system according to claim 45, wherein the geometric domain is a directed graph and wherein means to input graph motifs are configured to:
input a plurality of graph motifs; for each input graph motif
computing a new undirected weighted graph wherein the vertices are those of the input graph, and each edge is weighted by the occurrence of the graph motif;
computing said multi-dimensional pseudo-coordinates around each vertex of said undirected weighted graph;
computing said plurality of weighting functions acting on said pseudo -coordinates;
applying the weighting functions to define said patch operator extracting said local representation of the input data around said point on the geometric domain; and
outputting the correlation of said patch resulting from the extraction with said plurality of templates.

57. The system according to claim 56, wherein the multi-dimensional pseudo-coordinates of each undirected weighted graph comprise at least one of the following:
vertex degree;
geodesic distance from a vertex;
diffusion distance from a vertex.

58. The system according to claim 56, wherein the weighting functions are diffusion kernels and wherein said means to define the operator are configured to compute the weighted undirected graphs for all the input graph motifs.

59. The system according to claim 58, wherein the diffusion kernels comprise heat kernels with a plurality of time scales.

60. The system according to claim 59, wherein the diffusion kernels are anisotropic diffusion kernels.

61. A computer system for extracting hierarchical features from data defined on a geometric domain, comprising a memory and a processor for applying on said data at least an intrinsic convolution layer, where said computer system is configured to:
apply, by the processor, a patch operator for extracting a local representation of the input data around a point on the geometric domain and to return as output a correlation of said local representation resulting from the extraction with a plurality or templates;
apply at least another layer among the following layers:
a linear layer, including outputting a weighted linear combination of input data;
a non-linear layer, including applying a non-linear function to input data;
a spatial pooling layer, wherein:
a subset of points on the geometric domain are determined;
for each point of said subset, the neighbours on the geometric domain are determined; and
an aggregation operation on input data over the neighbours for all the points of said subset is computed;
a covariance layer, wherein a covariance matrix of input data over all the points of the geometric domain is computed;
a fully connected layer, having as output a weighted linear combination of input data at all the points of the geometric domain,
wherein each layer has input data and output data stored on the memory of the computer system, and said system comprehends means that are configured to provide as input data to a layer the output data of another layer, thereby improving the ability of the computer system to apply a deep learning method to said data.

62. The system according to claim 61, wherein said spatial pooling layer comprises an aggregation of input data over the whole domain.

63. The system according to claim 61, wherein said means to apply the spatial pooling layer are configured to process said aggregation of input data by means of one of the following computation:
maximum computation;
average computation;
weighted average computation;
average of squares computation.

64. The system according to claim 61, wherein said means for applying at least another layer are configured to apply at least another layer in sequence, providing the output data of one layer in the sequence as input data to a subsequent layer in the sequence.

65. The system according to claim 61, wherein said means for applying the intrinsic convolutional layer and said means for applying at least another layer are configured to set one or more of the following parameters to the applied layers:
weights of the linear layers;
templates of the intrinsic convolutional layers;
parameters of the weighting functions used to compute the patch operators in the intrinsic convolutional layer.

66. The system according to claim 65, wherein said means for applying the intrinsic convolutional layer and said means for applying at least another layer are configured to determine parameters of the applied layers by minimizing a cost function by means of an optimization procedure.

67. The system according to claim 66, wherein a plurality of said cost functions are defined and wherein each of said cost functions is associated to one or more application for which feature extraction may be carried out by the system.

68. The system according to claim 66, wherein the input into the optimization procedure is a training set comprising:
a positive set of pairs of points on one or more geometric domains; and
a negative set of pairs of points on one or more geometric domains; and
wherein two identical copies of the hierarchical system configured with the same parameters are fed with pairs of points from said positive and negative sets, and wherein the optimization procedure is configured to minimize the distance between the outputs corresponding to positive pairs and maximize the distance between the outputs corresponding to negative pairs.

69. A computer system for extracting hierarchical features from data defined on a geometric domain, comprising a memory and a processor for applying on said data at least an intrinsic convolution layer, said data being stored on the memory of the computer system, where said computer system is configured to:
apply, by the processor, a patch operator for extracting a local representation of the input data around a point on the geometric domain and to return as output a correlation of said local representation resulting from the extraction with a plurality of templates;
wherein the patch operator is configured to input data on geometric domain and said point on said domain, and to output the local representation of said data around said point, thereby improving the ability of the computer system to apply a deep learning method to said data,
wherein the local representation is one or more of the following:
data represented in a local intrinsic polar system of coordinates;
data transformed by a windowed Fourier transform;
data weighted by anisotropic diffusion kernels.

70. The system according to claim 69, wherein the patch operator is configured to output said local representation of input data in the local intrinsic polar system of coordinates, and wherein to provide an origin of angular coordinates of the local intrinsic polar system of coordinates as side information extracted from the geometric domain or the data.

71. The system according to claim 70, wherein the geometric domain is a surface and the side information for determining the origin of the angular coordinate of the local intrinsic polar system of coordinates at each point on the surface is a principle curvature direction at said point.

72. The system according to claim 70, wherein the side information for determining the origin of the angular coordinate of the local intrinsic polar system of coordinates at each point is a direction of a minimal or maximal absolute change of the data at said point.

73. The system according to claim 69, wherein the patch operator is configured to output said local representation of input data in the local intrinsic polar system of coordinates, and to apply the Fourier transform with respect to angular coordinates, followed by an absolute value operation.

74. The system according to claim 69, configured to compute the correlation between said patch and said plurality of templates by:
rotating each template along angular coordinates;
computing the correlation of the patch with the rotated template;
taking a maximum operation over all the rotations.

75. The system according to claim 69, wherein the patch operator if further configured to represent input data in the local polar system of coordinates around the point on the geometric domain by:
computing an intrinsic distance from said point to all the other points on the geometric domain;
computing level sets of said intrinsic distance at a plurality of levels;
splitting a full angle at said point into a plurality of angular directions;
shooting rays emanating from said point along said directions perpendicular to said level sets.

76. The system according to claim 75, wherein said intrinsic distance is one of the following or an approximation thereof:
geodesic distance;
diffusion distance;
commute time distance;
biharmonic distance.

77. The system according to claim 75, wherein the patch operator if further configured to represent input data by:
computing weights localized around level sets and rays;
computing weighted averages of input data with each of said weights.

78. The system according to claim 69, wherein the patch operator is further configured to compute the windowed Fourier transform of input data by:
computing localized modulated atoms;
computing inner products of data with said atoms.

79. The system according to claim 78, wherein localized modulated atoms are heat kernels multiplied by Laplacian eigenfunctions.

80. The system according to claim 79, wherein the heat kernels are anisotropic.

81. The system according to claim 69, further configured to compute the local representation of input data around a point on geometric domain by:
    computing a plurality of directed anisotropic heat kernels at said point, corresponding to a plurality of anisotropy constants and directions;
    computing weighted averages of input data with said directed anisotropic heat kernels.

* * * * *